(12) United States Patent
Kondo et al.

(10) Patent No.: US 7,724,298 B2
(45) Date of Patent: May 25, 2010

(54) IMAGE PROCESSING SYSTEM AND METHOD FOR PICK UP AND DISPLAY OF AN OBJECT INCLUDING DIVISION OF AN OPTICAL IMAGE OF THE OBJECT INTO A SPECTRUM

(75) Inventors: Tetsujiro Kondo, Tokyo (JP); Tetsushi Kokubo, Kanagawa (JP); Hitoshi Mukai, Kanagawa (JP); Hirofumi Hibi, Tokyo (JP); Tsugihiko Haga, Kanagawa (JP); Kenji Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 1006 days.

(21) Appl. No.: 10/574,590

(22) PCT Filed: Oct. 12, 2004

(86) PCT No.: PCT/JP2004/015014

§ 371 (c)(1),
(2), (4) Date: Apr. 4, 2006

(87) PCT Pub. No.: WO2005/033794

PCT Pub. Date: Apr. 14, 2005

(65) Prior Publication Data

US 2007/0052815 A1  Mar. 8, 2007

(30) Foreign Application Priority Data

Oct. 9, 2003 (JP) .............................. 2003-350367

(51) Int. Cl.
*H04N 3/08* (2006.01)
*H04N 9/07* (2006.01)
*G01J 3/40* (2006.01)
*G02B 5/18* (2006.01)

(52) U.S. Cl. ....................... 348/337; 348/203; 356/302; 359/573

(58) Field of Classification Search ................ 348/202, 348/203, 266, 268, 336, 337; 356/302, 305, 356/308, 404, 405, 406; 359/573
See application file for complete search history.

(56) References Cited

U.S. PATENT DOCUMENTS 6,715,888 B1 * 4/2004 Raskar et al. ................. 353/94

(Continued)

FOREIGN PATENT DOCUMENTS

JP 52-135618 11/1977

(Continued)

*Primary Examiner*—John M Villecco
(74) *Attorney, Agent, or Firm*—Oblon, Spivak, McClelland, Maier & Neustadt, L.L.P.

(57) ABSTRACT

The present invention relates to an image processing system and an image processing method, an image pickup apparatus and an image pickup method, and an image display device and an image display method, which can faithfully pick up and display the colors of an object. Slit light of an optical image of the object that has passed through a slit 42 is divided into a spectrum by a light divider 43. A light sensor 44 outputs image data based on the spectrum of the slit light of the optical image of the object. A micromirror array 74 causes the exiting of reflection light formed by extracting spectrum portions based on the image data from a spectrum of incident white light from a light divider 73. The spectrum portions of the reflection light exiting from the micromirror array 74 are synthesized by a spectrum synthesizer 77 and are projected onto a screen 111. The present invention is applicable to the image processing system.

28 Claims, 23 Drawing Sheets

U.S. PATENT DOCUMENTS

| | | | |
|---|---|---|---|
| 6,985,294 B1 * | 1/2006 | Rosenthal et al. | 359/573 |
| 7,084,973 B1 * | 8/2006 | Ingram | 356/326 |
| 7,385,173 B2 * | 6/2008 | Seyfried et al. | 348/336 |
| 7,437,000 B1 * | 10/2008 | Rosenthal et al. | 356/302 |

FOREIGN PATENT DOCUMENTS

| | | |
|---|---|---|
| JP | 52-138843 | 11/1977 |
| JP | 52-141683 | 11/1977 |
| JP | 61-29711 | 2/1986 |
| JP | 10-31168 | 2/1998 |
| JP | 2000-137191 | 5/2000 |
| JP | 2001-194599 | 7/2001 |
| JP | 2002-55307 | 2/2002 |
| JP | 2002-71461 | 3/2002 |
| JP | 2002-162573 | 6/2002 |
| JP | 2003-121782 | 4/2003 |

* cited by examiner

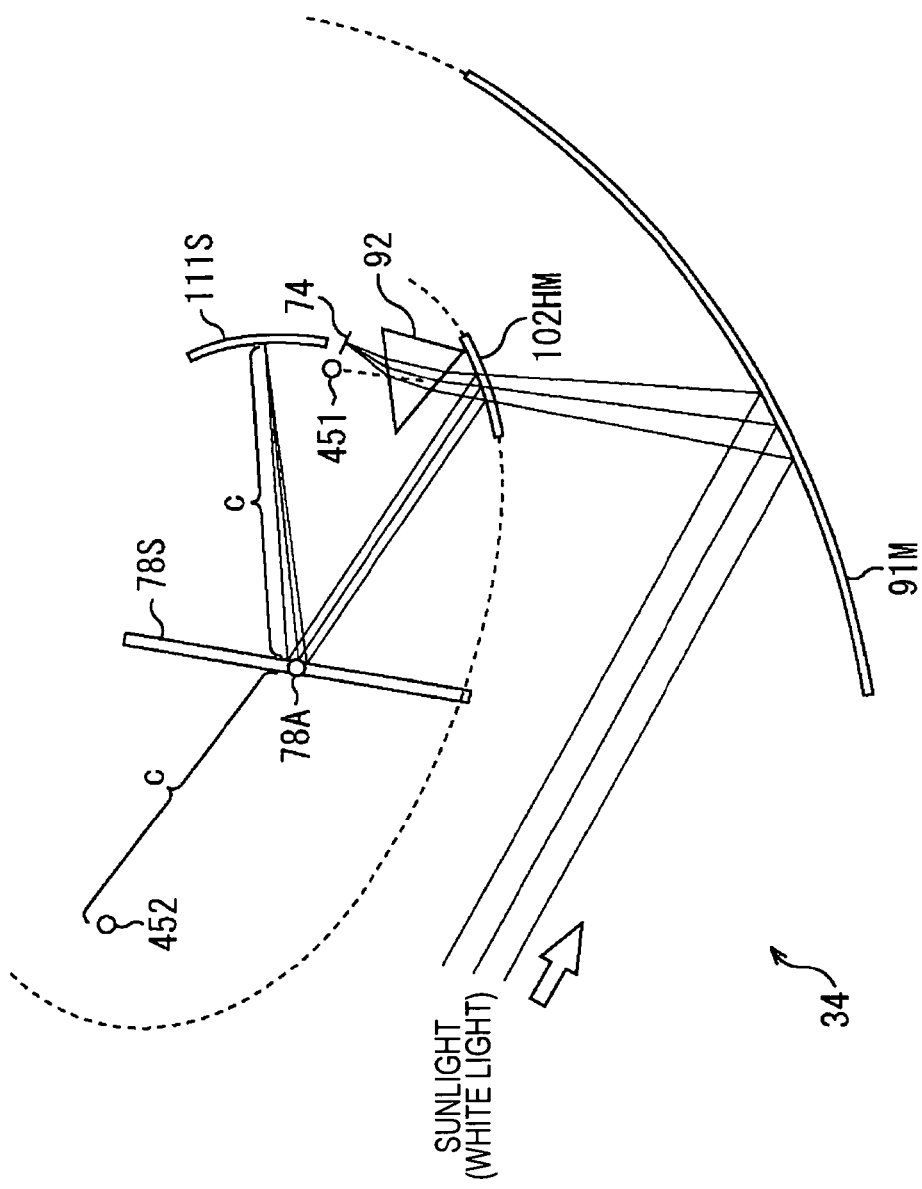

IMAGE PROCESSING SYSTEM AND METHOD FOR PICK UP AND DISPLAY OF AN OBJECT INCLUDING DIVISION OF AN OPTICAL IMAGE OF THE OBJECT INTO A SPECTRUM

TECHNICAL FIELD

The present invention relates to an image processing system and an image processing method, an image pickup device and an image pickup method, and an image display device and an image display method. More particularly, the present invention relates to an image processing system and an image processing method, an image pickup device and an image pickup method, and an image display device and an image display method, which can faithfully pick up and display the colors of an object.

BACKGROUND ART

In recent years, image apparatuses handling various color images, as typified by TV receivers and video cameras, are in widespread use in the world. Most of these image apparatuses pick up an object and display an image of the picked-up object, on the basis of three primary colors (such as, red, green, and blue).

A system which displays an optical image of an object by dividing a spectrum of the optical image into four or more wavelength bands and recording the optical image, in order to make it possible to faithfully reproduce the colors of the object by using an apparatus handling an image on the basis of three primary colors is proposed (for example, in Japanese Unexamined Patent Application Publication No. 2003-134351 (Patent Document 1)).

DISCLOSURE OF INVENTION

Problems to be Solved by the Invention

However, a related image apparatus handling an image on the basis of three primary colors cannot present all of the colors in the visible light region of a human being. In other words, as shown in FIG. 1 showing the chromaticity in an XYZ color coordinate system, all of the colors which can be seen by a human being are included within a substantially horseshoe-shaped area 1. Of these colors, the location of the colors produced by synthesizing three colors, red, green, and blue is limited to within a triangular area 2 defined by vertices R, G, and B. The vertex R represents a red coordinate in the diagram showing the chromaticity in the XYZ color coordinate system, the vertex G represents a green coordinate in the diagram showing the chromaticity in the XYZ color coordinate system, and the vertex G represents a blue coordinate in the diagram showing the chromaticity in the XYZ color coordinate system. Therefore, since the image apparatus handling an image on the basis of three primary colors cannot present the colors included in a portion which lies within the area 1 but outside the area 2, the image apparatus cannot faithfully pick up and display the colors of an object.

In the invention described in Patent Document 1, it is necessary to provide a plurality of filters when shooting, to perform switching from one filter to another in order to separate and extract wavelength components of an optical image of an object, and to estimate a spectrum of the optical image of the object on the basis of various data, algorithms, and functions, from the extracted wavelength components. In addition, since the estimated spectrum of the optical image of the object is converted into display data on the basis of the various data, algorithms, and functions, not only does the processing become complicated, but also the colors which are displayable are limited by the algorithms and functions, as a result of which it is difficult to satisfactorily faithfully reproduce the colors.

The present invention is achieved in view of such a situation and makes it possible to faithfully pick up and display the colors of an object.

An image processing system according to the present invention comprises first dividing means for dividing an optical image of an object into a spectrum, detecting means for detecting the spectrum obtained by the first dividing means and outputting image data based on the detected spectrum, second dividing means for dividing white light into a spectrum, extracting means for extracting, from the spectrum of the white light divided into the spectrum by the second dividing means, spectrum portions based on the image data detected by the detecting means, synthesizing means for synthesizing the spectrum portions extracted by the extracting means, and projecting means for projecting light formed by synthesizing the spectrum portions by the synthesizing means.

An image processing method according to the present invention comprises the steps of performing a first dividing operation for dividing an optical image of an object into a spectrum, detecting the spectrum obtained by the first dividing operation and outputting image data based on the detected spectrum, performing a second dividing operation for dividing white light into a spectrum, extracting, from the spectrum of the white light divided into the spectrum by the second dividing operation, spectrum portions based on the image data output by the detecting operation, synthesizing the spectrum portions extracted by the extracting operation, and projecting light formed by synthesizing the spectrum portions by the synthesizing operation.

An image pickup device according to the present invention comprises dividing means for dividing an optical image of an object into a spectrum and detecting means for detecting the spectrum obtained by the dividing means and outputting a pixel of image data based on the detected spectrum.

The image pickup device may further comprise separating means for separating one line of light forming the optical image of the object and supplying the separated one line of light to the dividing means and focusing means for focusing the optical image of the object onto the detecting means, wherein the detecting means includes a plurality of photoelectric sensors disposed in a plane for detecting the strength of the light, each photoelectric sensor detecting a spectral component of each pixel of the one line of light.

Each photoelectric sensor may include an electron shock CCD.

The separating means may include a slit and adjusting means, the slit separating the one line of the optical image of the object, the adjusting means adjusting a position where the optical image of the object is incident upon the slit.

The image pickup device may further comprise focus means disposed just behind the slit for focusing thereon the optical image of the object, wherein the focusing means temporarily focuses the optical image of the object on the focus means.

It is possible for the dividing means to include a prism and the image pickup device to further comprise an optical member causing the light exiting from the slit to be incident upon the prism as parallel light and the spectrum exiting from the prism to exit as converging light to the detecting means.

The adjusting means may include a galvano-mirror or a polygon mirror.

It is possible for the adjusting means to adjust the incident position so that the entire optical image of the object is incident upon the slit every first period, and the detecting means to output the image data every second period.

It is possible for the first period to be a vertical scanning period and the second period to be a horizontal scanning period.

The image pickup device may further comprise accumulating means for accumulating the image data output by the detecting means.

An image pickup method according to the present invention comprises the steps of dividing an optical image of an object into a spectrum and detecting the spectrum obtained by the dividing operation and outputting a pixel of image data based on the detected spectrum.

An image display device according to the present invention comprises dividing means for dividing white light into a spectrum, obtaining means for obtaining image data based on a spectrum of an optical image of an object, extracting means for extracting by pixel spectrum portions based on the image data from the spectrum of the white light divided into the spectrum by the dividing means, synthesizing means for synthesizing the spectrum portions extracted by the extracting means, projecting means for projecting light formed by synthesizing the spectrum portions by the synthesizing means, and adjusting means for adjusting a position of projection by the projecting means.

The adjusting means may include a galvano-mirror or a polygon mirror.

The extracting means may include at least one reflector or transmission unit, the number of the at least one reflector or transmission unit being in correspondence with the number of pixels forming one line in a direction parallel with a line of the optical image of the object and in correspondence with the number of spectrum portions of the optical image of the object for one pixel in a direction perpendicular to the line, the at least one reflector or transmission unit controlling reflection or transmission of the spectrum of the white light on the basis of the image data obtained by the obtaining means.

The at least one reflector of the extracting means may include a micromirror or reflective liquid crystal.

The at least one transmission unit of the extracting means may include transmissive liquid crystal.

It is possible for the obtaining means to obtain the image data every first period and the adjusting means to adjust the projection position of the light formed by synthesizing the spectrum portions so that a line is successively displaced from another line every first period and one frame of image based on the image data is projected every second period.

It is possible for the first period to be a horizontal scanning period and the second period to be a vertical scanning period.

It is possible for the dividing means to include a lamp for emitting the white light, a condensing optical system for condensing the white light from the lamp into the form of a line, and a spectral prism for dividing the white light into the spectrum, and the synthesizing means to include a synthesizing prism for synthesizing the spectrum portions extracted by the extracting means.

The condensing optical system may include a cylindrical lens or a parabolic sweep mirror.

The image display device may further comprise a first optical member and a second optical member, the first optical member causing the light incident upon the spectral prism or the synthesizing prism to be parallel light, the second optical member causing the light exiting from the spectral prism or the synthesizing prism to be converging light.

It is possible for the extracting means to be the reflector, the spectral prism and the synthesizing prism to be formed as one prism, and the image display device to further comprise separating means for separating light traveling towards the reflector from light traveling away from the reflector.

At least one of the condensing optical system and the projecting means may be a mirror.

It is possible for the condensing optical system to be a parabolic sweep mirror and the projecting means to be an elliptical sweep mirror.

A focus of the elliptical sweep mirror may be positioned so as to optically correspond with a focus of the parabolic sweep mirror.

The light formed by synthesizing the spectrum portions may be projected towards the other focus of the elliptical sweep mirror.

It is possible for the condensing optical system to be a parabolic sweep mirror and the projecting means to be an elliptical sweep half mirror.

It is possible for the dividing means to include a lamp for emitting the white light, a slit for separating in the form of a line a portion of the white light from the lamp, and a spectral prism for dividing the portion of the white light into the spectrum, and the synthesizing means to include a synthesizing prism for synthesizing the spectrum portions extracted by the extracting means.

The image display device may further comprise a cylindrical screen for projecting thereon the light formed by synthesizing the spectrum portions.

An image display method according to the present invention comprises the steps of dividing white light into a spectrum, obtaining image data based on a spectrum of an optical image of an object, extracting by pixel spectrum portions based on the image data from the spectrum of the white light divided into the spectrum by the dividing operation, synthesizing the spectrum portions extracted by the extracting operation, and adjusting a position of the light formed by synthesizing the spectrum portions by the synthesizing operation.

In the image processing system and the image processing method according to the present invention, the optical image of the object is divided into a spectrum, the spectrum is detected, image data based on the detected spectrum is output, white light is divided into a spectrum, spectrum portions based on the output data are extracted from the spectrum of the white light divided into its spectrum, the extracted spectrum portions are synthesized, and light formed by synthesizing the spectrum portions is projected.

In the image pickup device and the image pickup method according to the present invention, the optical image of the object is divided into a spectrum, the spectrum is detected, and a pixel of image data based on the detected spectrum is output.

In the image display device and the image display method according to the present invention, white light is divided into a spectrum, image data based on a spectrum of an optical image of an object is obtained, spectrum portions based on the image data are extracted by pixel from the spectrum of the white light divided into its spectrum, the extracted spectrum portions are synthesized, and the position of light formed by synthesizing the spectrum portions is adjusted.

Advantages of the Invention

According to the present invention, it is possible to pick up an object and display a picked-up image. In particular, according to the present invention, it is possible to faithfully pick up the colors of an object and to faithfully display the colors of a picked-up image.

BRIEF DESCRIPTION OF THE DRAWINGS

FIG. 26 shows a display device of still another structure.

REFERENCE NUMERALS

21 image processing system, 31 sensing device, 32 transmitter, 33 accumulator, 34 display device, 41 galvano-mirror, 42 slit, 43 light divider, 44 light sensor, 45 A/D converter, 46 output section, 47 oscillator, 61 lens system, 62 prism, 71 light source, 72 slit, 73 light divider, 74 micromirror array, 75 input section, 76 driver, 77 spectrum synthesizer, 78 galvanomirror, 79 light exiting section, 80 oscillator, 91 lens system, 92 prism, 101 prism, 102 lens system, 111 screen, 121 electron impact CCD, 151 micromirror

BEST MODE FOR CARRYING OUT THE INVENTION

An embodiment of the present invention will hereunder be described with reference to the drawings.

Figure 1:
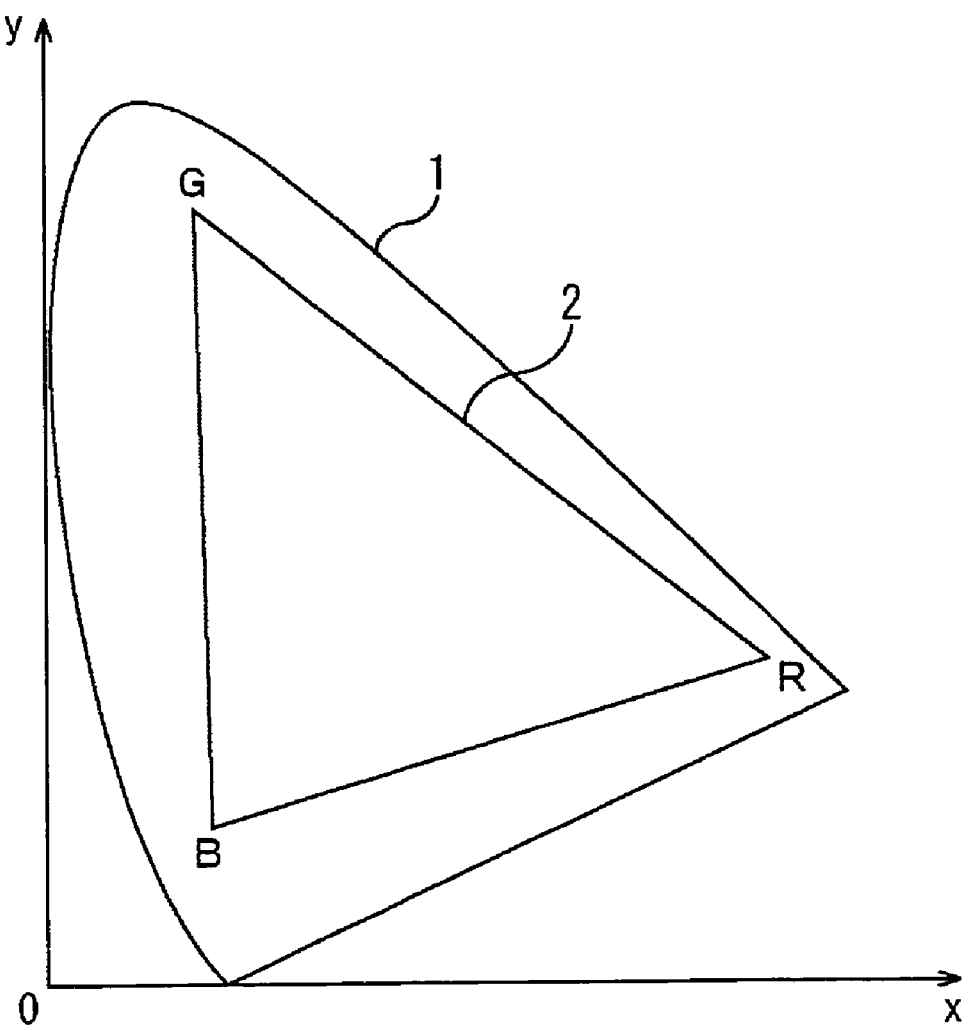
FIG. 1 illustrates the chromaticity in an XYZ color coordinate system.
Figure 2:
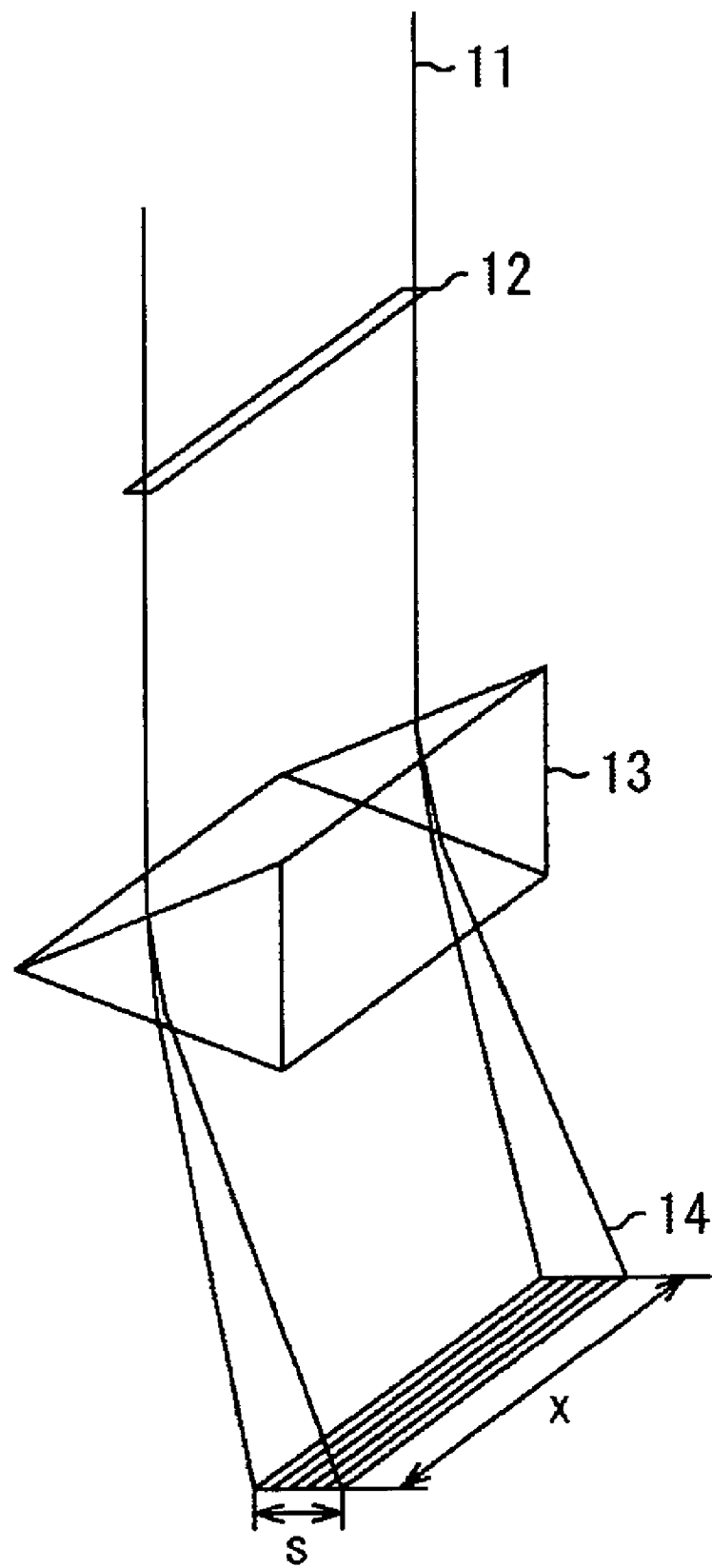
FIG. 2 illustrates the principle of an image processing system.

FIG. 2 illustrates the principle of the present invention. When sunlight 11 passes through a slit 12, an elongated linear light beam having a sufficiently narrow width is separated in one direction. The sunlight 11 includes various wavelengths, with the refractive indices of the light being different according to the respective wavelengths. Therefore, when the sunlight 11 separated by the slit 12 passes through the upper surface of a prism 13, the light is refracted at different angles due to differences in wavelengths, as a result of which the paths of the light having different wavelengths are dispersed. In addition, when the sunlight 11 passes through the lower surface of the prism 13, the light is refracted at different angles due to differences in wavelengths, thereby increasing the difference between the paths of the light having different wavelengths. Accordingly, the light (spectrum 14) having various wavelengths included in the sunlight 11 exits from the lower surface of the prism 13. In other words, the spectrum 14 of the sunlight 11 is dispersed (divided) according to the wavelengths by the prism 13. Here, the spectrum 14 appears in an illustrated S direction (widthwise direction of the slit 12), and pixel components at the position of the spectrum 14 appear in an X direction perpendicular to the S direction (longitudinal direction of the slit 12).

Light (colors) seen by a human being other than sunlight (natural light), has various wavelengths, but such light is basically a reflection component of sunlight (natural light). Therefore, if it is possible to divide such light from an object into a spectrum, to precisely detect the spectrum, and to adjust a spectrum of a display image on the basis of detected data and display the spectrum, it is possible to achieve an image apparatus which can faithfully pick up and display the colors of the object compared to a related image apparatus handling an image on the basis of, for example, the three primary colors, red, green, and blue.

Accordingly, in the present invention, an optical image of an object is divided into a spectrum, the object is picked up on the basis of the spectrum, and a picked-up image is displayed. In other words, the spectrum of the optical image of the object is detected, image data is generated on the basis of the detected spectrum, and an image obtained by synthesizing spectrum portions extracted on the basis of the image data is displayed.

Figure 3:
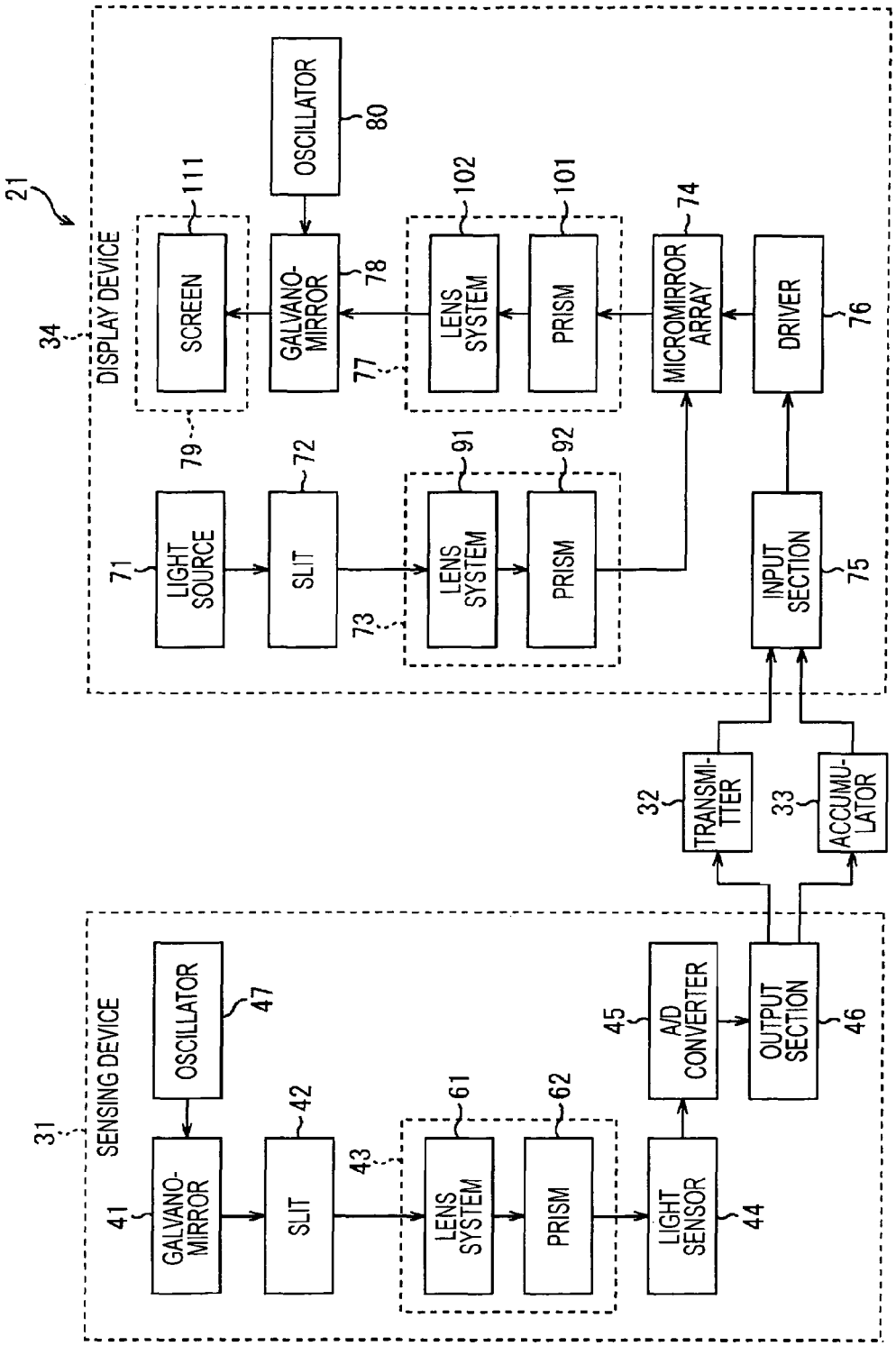
FIG. 3 is a block diagram of a functional structure of the image processing system.
Figure 4:
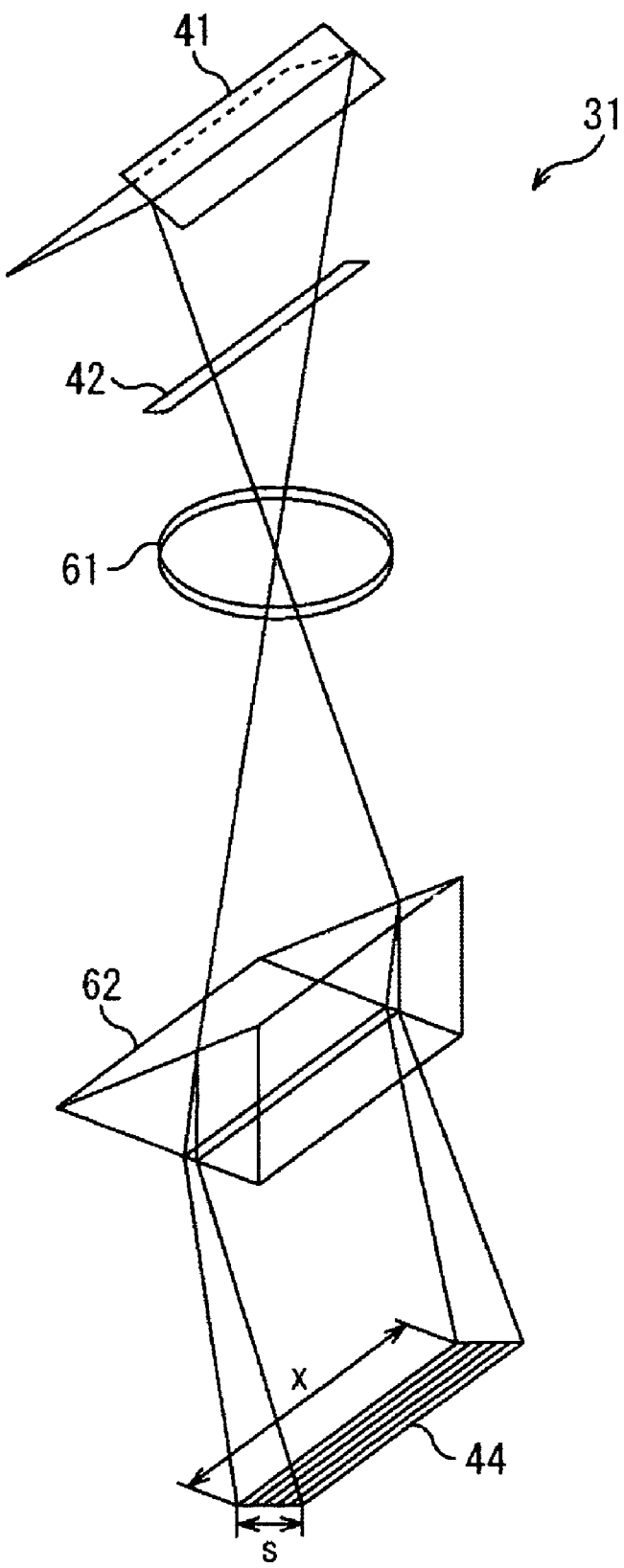
FIG. 4 shows a path taken by light in a sensing device of the image processing system.
Figure 5:
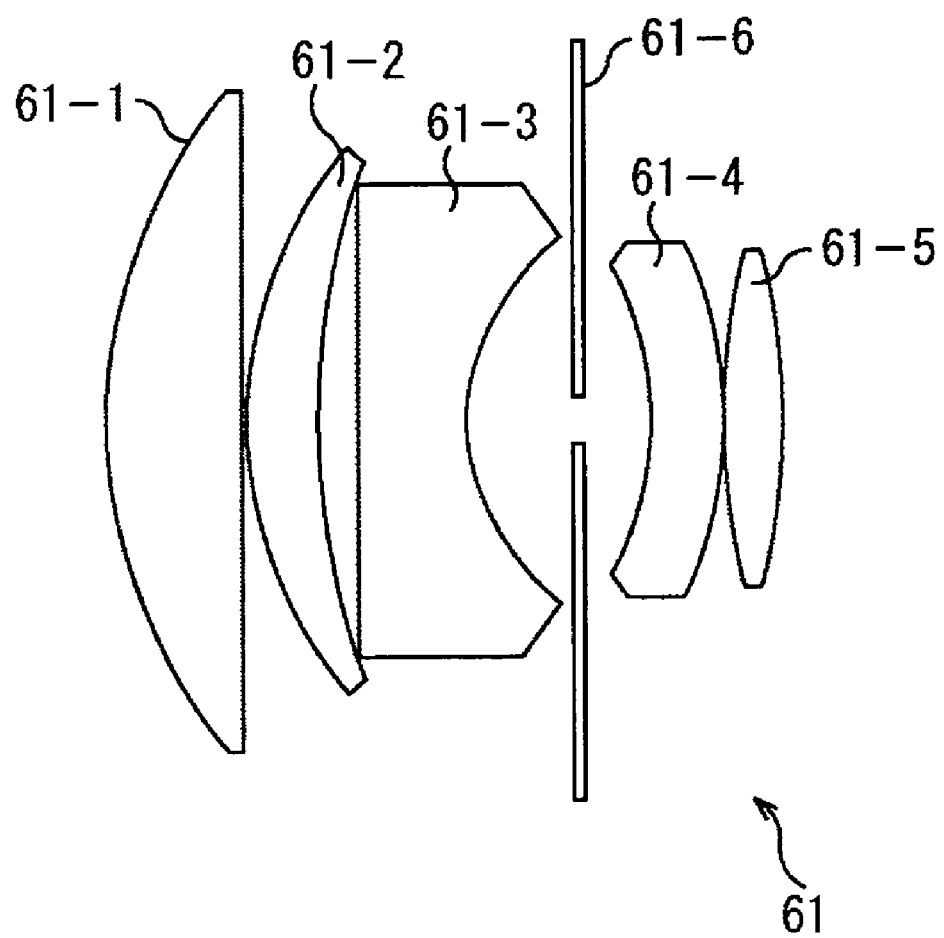
FIG. 5 is a sectional view of a detailed structure of a lens system.
Figure 6:
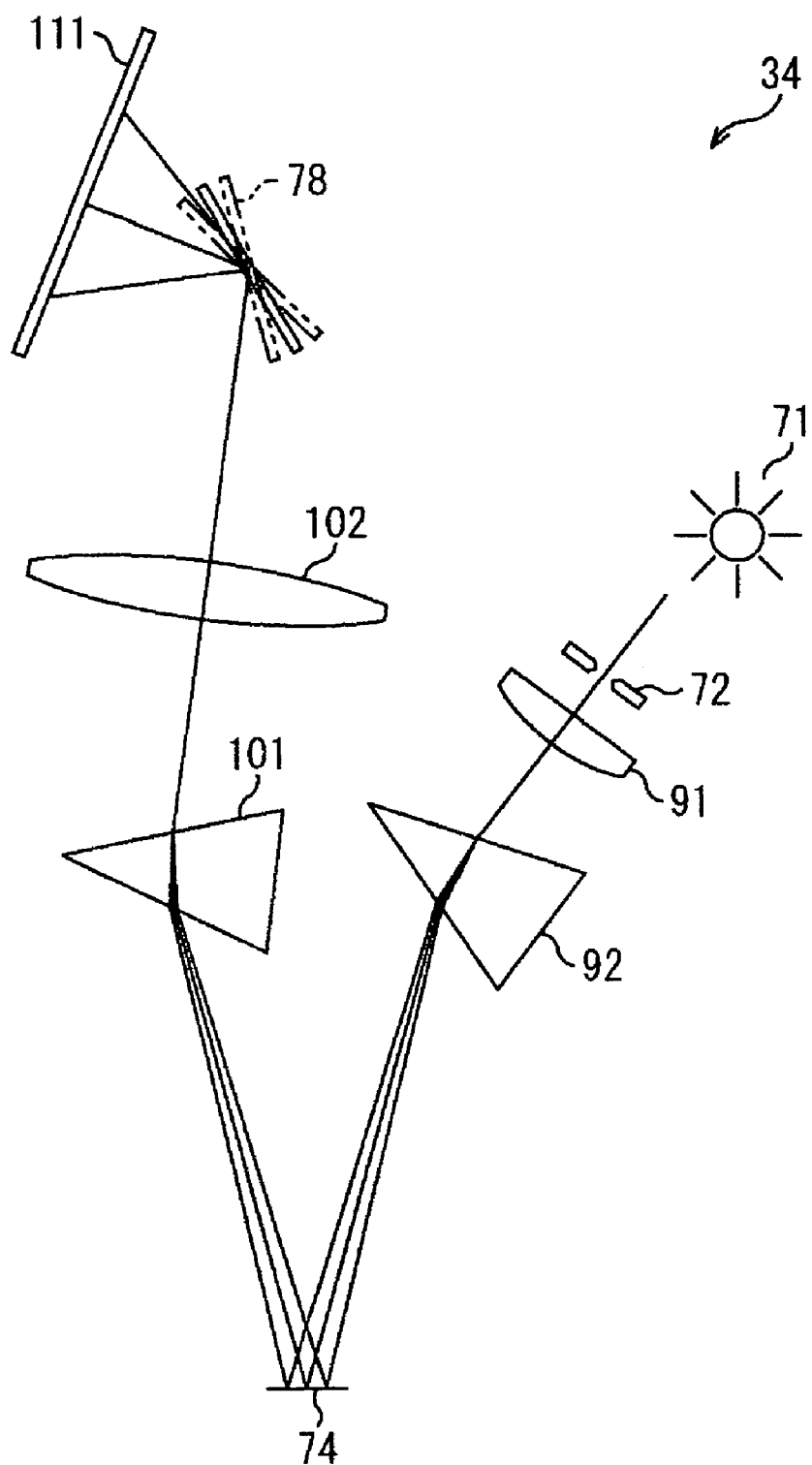
FIG. 6 shows a path taken by light in a display device of the image processing system.

FIG. 3 is a block diagram of a functional structure of an image processing system 21 to which the present invention is applied. FIG. 4 is a schematic view of a path taken by light (an optical image of an object) in a sensing device 31 of the image processing system 21. FIG. 5 shows an example of a specific structure of a lens system 61 shown in FIG. 4. FIG. 6 is a schematic view of a path taken by light (white light and a display image) in a display device 34 of the image processing system 21.

The image processing system 21 includes the sensing device 31, a transmitter 32, an accumulator 33, and the display device 34.

The sensing device 31 picks up an optical image of an object. More specifically, the sensing device 31 detects a spectrum of the optical image of the object and generates image data based on the detected spectrum. The sensing device 31 outputs the generated image data to the transmitter 32 or the accumulator 33. The display device 34 displays an image based on the image data by obtaining the image data through the transmitter 32 or by obtaining the image data accumulated in the accumulator 33.

The sensing device 31, the transmitter 32, the accumulator 33, and the display device 34 may be disposed in the same housing or in different housings, respectively. The sensing device 31 and the accumulator 33 may be disposed in the same housing.

For the transmission of the image data by the transmitter 32, for example, a transmission format based on Low Voltage Differential Signaling (LVDS) that has low noise and low power consumption and that is capable of being used in high-speed transmission may be used.

The transmission of the image data by the transmitter 32 may be a wired or a wireless transmission.

A storage medium used in the accumulator 33 may be, for example, a hard disc or a removable medium such as a semiconductor memory, an optical disc, or a magnetic disc.

The sensing device 31 includes a galvano-mirror 41, a slit 42, a light divider 43, a light sensor 44, an A/D converter 45, an output section 46, and an oscillator 47.

The galvano-mirror 41 (see FIG. 4) is a deflector for adjusting (deflecting) the direction of reflection of light (optical image of an object) incident upon one planar mirror which is disposed at a rotary shaft (not shown) and which rotates around the rotary shaft by a controlling operation of the oscillator 47. The optical image of the object picked up by the sensing device 31 first impinges upon the galvano-mirror 41 and is reflected towards the slit 42.

The optical image of the object reflected by the galvano-mirror 41 passes through the slit 41, thereby separating one horizontal elongated linear light beam of the object (hereafter referred to as "slit light of the object"). With the slit light of the object separated by the slit 42 being defined as one unit (one line), the sensing device 31 divides the optical image of the object into a plurality of horizontal straight lines in a vertical direction and picks up the optical image. The display device 34 (described later) displays as one horizontal scanning line one unit of the slit light of the picked-up object, and the number of divisions in the vertical direction is the number of scanning lines in the vertical direction.

The galvano-mirror 41 is disposed so as to be rotatable vertically with respect to the object to be picked up. The oscillator 47 rotates the galvano-mirror 41 at a constant velocity so that the entire optical image of the object to be picked up passes through the slit 42 downward in a constant period (hereafter referred to as a vertical scanning period T). In other words, one frame of the optical image of the object is vertically scanned every vertical scanning period T by using the galvano-mirror 41.

The slit light of the object separated by the slit 42 impinges upon the light divider 43. The light divider 43 includes the lens system 61 and a prism 62. As shown in FIG. 4, the slit light of the object that has passed through the lens system 61 passes through the prism 62, so that a spectrum based on wavelength components of the slit light of the object (hereafter referred to as "object spectrum") is separated, and is focused on a surface of the light sensor 44.

The lens system 61, like a camera lens, is a combination of a plurality of lenses and, as a whole, plays the role of a convex lens to focus the slit image of the object that has passed through the lens system 61. In principle, it is possible to use a pinhole lens for the lens system 61, but, practically speaking, it is desirable for the lens system 61 to have little chromatic aberration in order to reduce displacement of the position of the light incident upon the upper surface of the image pickup element 44, the displacement being caused by differences in wavelengths when a prism is not disposed. In addition, in order to sharply focus an image on the image pickup element 44, it is desirable to use a lens having a small diameter in the lens system 61 or to use a stop so that it is sufficiently stopped down.

FIG. 5 shows an example of a detailed structure of the lens system 61. In this structure, the lens system 61 is formed by combining a plurality of lenses 61-1 to 61-5 for correcting aberration. In addition, a stop 61-6 is disposed between the lens 61-3 and the lens 61-4. As mentioned above, the stop 61-6 to is used so that it is stopped down to the extent possible.

The prism 62 is desirably formed of glass having a large refractive index or other such material so as to shorten the distance between the prism 62 and the light sensor 44 (so as to divide light into a spectrum having a large width in a small distance).

The object spectrum focused on the surface of the light sensor 44 is converted from a light signal into an electrical signal by the light sensor 44.

Figure 7:
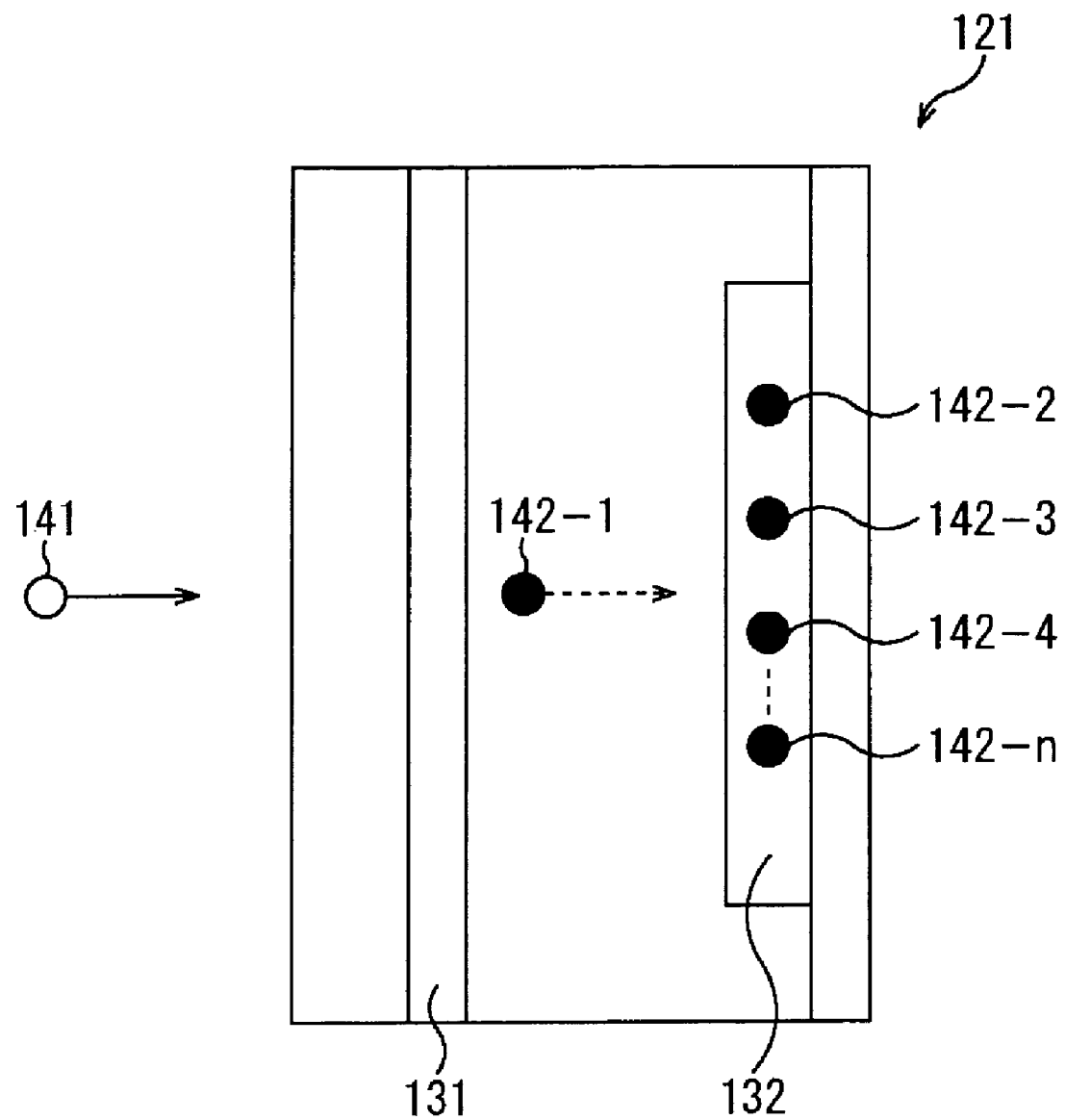
FIG. 7 is a sectional view of a structure of an electron impact CCD.

The light sensor 44 is, for example, a camera using an electron-impact charge coupled device (CCD). FIG. 7 is a sectional view of a structure of an electron shock CCD 121. When a photon 141 impinges upon a photoelectric cathode 131 of the electron shock CCD 121, an electron 142-1 is emitted by photoelectric conversion. At this time, a very high voltage is applied between the photoelectric cathode 131 and a back thin-plate CCD portion 132, causing the electron 142-1 to be accelerated by the applied voltage and to be driven into the back thin-plate CCD portion 132. Therefore, the electron shock CCD 121 can intensify the electrical signal at a high S/N ratio even with respect to a very weak input light. Consequently, compared to a general CCD, the electron shock CCD 121 has high sensitivity and can precisely detect the strength (luminance) of the object spectrum that impinges upon the light sensor 44. An electron 142-i (i=1, 2, . . . , n) accumulated at the back thin-plate CCD portion 132 is output as an electrical signal every constant period.

Figure 8:
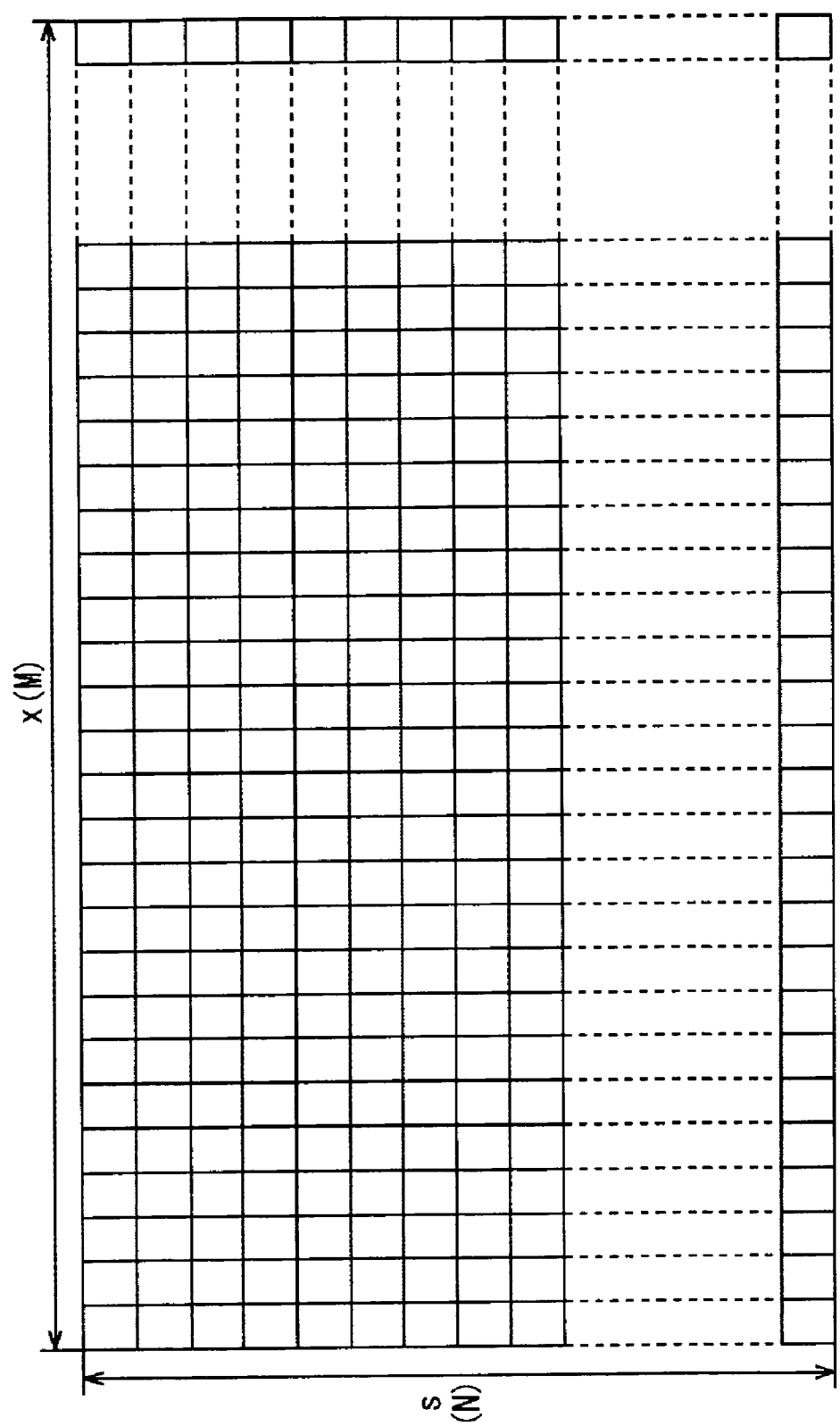
FIG. 8 is a plan view of an arrangement of electron impact CCDs at a light sensor and an arrangement of micromirrors of a micromirror array.

As shown in FIG. 8, in the light sensor 44, M electron shock CCDs 121 and N electron shock CCDs 121 are disposed in an x direction and an S direction, respectively, in a plane and in a lattice form within a rectangular area. A component in the direction in which the object spectrum changes (color changes) impinges upon the light sensor 44 in the S direction and a pixel component (component in the longitudinal direction of the slit 42) impinges upon the light sensor 44 in the x direction. At this time, spectral portions of the object spectrum having wavelengths in the visible light range (wavelengths from 380 nm to 780 nm) are incident upon the range of the light sensor 44 in the S direction.

The light sensor 44 outputs as an electrical signal an electron (electrical charge) that has been accumulated as a result of the object spectrum impinging upon the light sensor 44 every constant period (hereafter referred to as horizontal scanning period H). At this time, the output electrical signal is image data of one horizontal scanning line of the image to be picked up. For example, when M electron shock CCDs 121 and N electron shock CCDs 121 are disposed in the x direction and the S direction of the lattice of the light sensor 44, respectively, the image data of one horizontal scanning line is divided into M pixels, and the pixels are detected as N spectral components having wavelengths in the visible light range (wavelengths from 380nm to 780 nm), so that the image data is output by pixel.

The light sensor 44 outputs image data (an f line of image data, an f line of one frame) an f number of times in the vertical scanning period T. The f number of times is the number of scanning lines of the image data in the vertical direction. In other words, the relationship among the vertical scanning period T, the horizontal scanning period H, and the number f of vertical scanning lines is as shown in Formula (1).

Vertical Scanning Period $T$=Horizontal Scanning Period $H$×Number $f$ of Vertical Scanning Lines+ Return Time α     (1)

The return time α represents the time required for the galvano-mirror 41 to return to its original position (where the topmost line of the optical image of the object to be picked up is picked up) after scanning the entire (one frame of the) optical image of the object to be picked up (that is, after picking up the lowest line of the optical image of the object).

The image data output by the light sensor 44 is input to the A/D converter 45 and is converted from analog data into digital data. At this time, the analog data is converted into n bits of digital data on the basis of the size of the image data. That is, the image data is divided into N spectral components per pixel, and the divided spectral components are represented as n bits of digital data in accordance with the strengths, so that one pixel represents N×n bits of data.

When the image data converted into digital data by the A/D converter 45 is to be used to display an image in real time, it is output to the transmitter 32 through the output section 46, and is supplied to the display device 34 through the transmitter 32. When the image data is to be recorded, the image data is output to the accumulator 33 through the output section 46 and is accumulated.

The display device 34 includes a light source 71, a slit 72, a light divider 73, a micromirror array 74, an input section 75, a driver 76, a spectrum synthesizer 77, a galvano-mirror 78, a light exiting section 79, and an oscillator 80.

For the light source 71, sunlight or a lamp, such as a xenon lamp, which emits light (white light) having a spectrum corresponding to that of sunlight is used.

As shown in FIG. 6, as at the sensing device 31, white light generated by the light source 71 is such that one light beam having the shape of an elongated line in cross section is separated from the white light by the slit 72. The light beam is divided into a spectrum by a prism 92 of the light divider 73. When the slit 72 is formed into a double slit or both the slit 72 and the lens system 91 are used, it is possible to focus the light beam in a form closer to a line segment. The spectrum of the divided white light is temporarily focused on a surface of the micromirror array 74. When the slit 72 and the lens system 91 are both used, the slit 72 and the lens system 91 are disposed so that an image of the slit 72 is focused on the image pickup element 74. Since the prism is disposed in between, "to focus" here means "to focus according to wavelength." When only the lens system 91 is used, the lens system 91 is disposed so that a parallel light beam of the sun when sunlight is used or a light beam emitted from the light source 71 when, for example, a xenon lamp is used is focused on the image pickup element 74. When only the slit 72 is used, the position of the slit 72 is not strictly limited. When the lens system 91 is used, a light condensing optical system capable of condensing light into a linear shape, such as a cylindrical lens, a parabolic sweep mirror (which is a mirror that looks like a flat plate whose cross section is bent into a parabolic shape), or an elliptical sweep mirror (which is a mirror that similarly looks like a flat plate whose cross section is bent into an elliptical shape), is used for the lens system 91. A larger amount of light energy can be used when the lens system 91 is used than when the slit 72 is used.

In the micromirror array (Digital Micromirror Device (trademark)) 74, micromirrors (trademark), formed by finely processing silicon, are disposed as reflectors in a plane and in a lattice form and reflect predetermined spectrum portions of the spectrum of the incident white light towards the spectrum synthesizer 77. Each micromirror is such that its angle with respect to the spectrum of the incident white light from the prism 92 is separately controlled by the driver 76. The output of the reflection light is switched to an on setting or an off setting by this angle. Here, the term "on" refers to reflecting spectrum portions towards the spectrum synthesizer 77 (setting to a synthesizing state), while the term "off" refers to reflecting spectrum portions in a direction other than towards the spectrum synthesizer 77 (setting to a non-synthesizing state). By performing the on/off control on the output of the reflection light, the spectrum portions included in the refection light are controlled. By controlling the on/off continuation time of the output of the reflection light, the luminance of the reflection light is controlled according to the spectrum portions included in the reflection light.

Basically, the number and arrangement of the micromirrors of the micromirror array 74 are the same as those of the electron shock CCDs 121 of the light sensor 44 shown in FIG. 8. The micromirror array 74 is disposed so that the spectrum of the white light incident upon the micromirrors are the same as the object spectrum incident upon the electron shock CCDs 121 disposed at corresponding locations within the lattice of the light sensor 44. Obviously, with the number of micromirrors being equal to or greater than N×M micromirrors, some of the may be used. If some of the N×M data are only used, a smaller number of them may be used.

The driver 76 obtains the image data from the transmitter 32 or the accumulator 33 through the input section 75, and performs the on/off setting (including the on/off time) control on the output of the reflection light of the micromirrors. Here, the electron shock CCDs 121 and the micromirrors that are disposed in corresponding locations within the lattice shown in FIG. 8 are in a one-to-one correspondence. The micromirrors are controlled on the basis of the image data output from the respective electron shock CCDs 121. In other words, by controlling the on/off setting of the reflection of the spectrum of the white light by the respective micromirrors on the basis of the image data output from the respective electron shock CCDs 121, the micromirror array 74 extracts spectrum portions based on the image data from the spectrum of the incident white light from the prism 92, and causes the exiting of (reflects) with the same brightness the spectrum portions that are the same as the spectrum of the optical image of the object that has impinged upon the light sensor 44 when the image data is detected.

The spectrum synthesizer 77 includes a prism 101 and a lens system 102. The spectrum portions of the reflection light exiting from the micromirror array 74 are synthesized by passing through the prism 101 of the spectrum synthesizer 77, so that one elongated linear light beam is formed at the upper surface (light exiting surface) of the prism 101. The linear light beam becomes light having the same components (including brightness) as the slit light of the object that has impinged upon the upper surface (incident surface) of the prism 62 of the sensing device 31 when the image data to be displayed (image data used for a controlling operation when the spectrum portions of the reflection light on which the linear light beam is based are output from the micromirror array 74) is detected by the sensing device 31. Accordingly, it becomes one horizontal scanning line of the image to be displayed on a screen 111. Hereafter, the linear light beam in which the spectrum portions have been synthesized by the prism 101 will be referred to as "display image scanning line." The screen 111, instead of being a planar screen, may be a cylindrical screen like a screen 111S (described later) shown in FIG. 22.

When each micromirror of the micromirror array 74 is controlled to an on setting, the angle of each micromirror with respect to the spectrum of the white light is separately adjusted so that the spectrum is incident upon each micromirror from the prism 92 and a spectrum portion reflected by each micromirror is synthesized at the light exiting surface of the prism 101.

Here, the angles of the micromirrors will be explained with reference to FIGS. 9 and 10.

Figure 9:
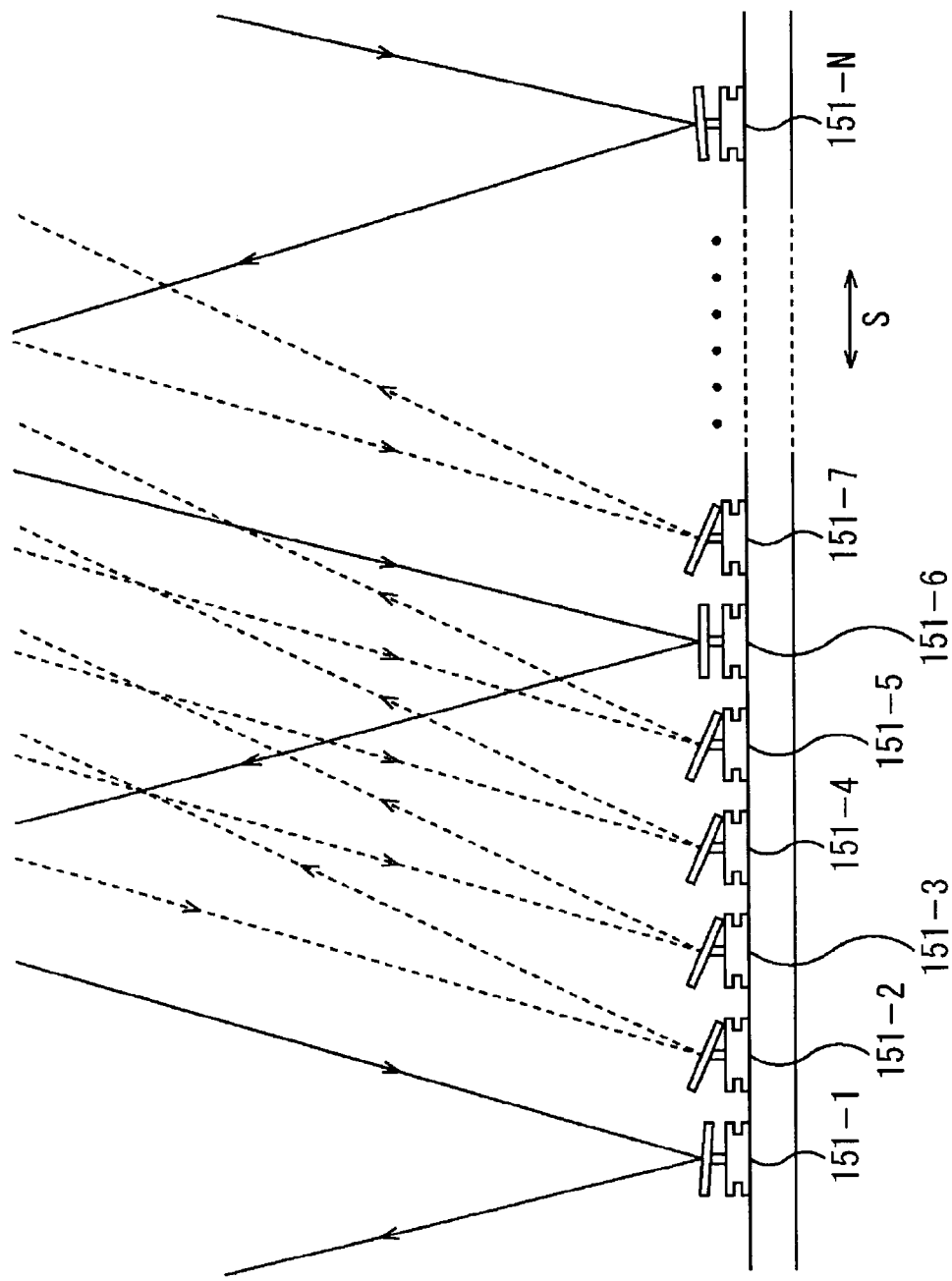
FIG. 9 illustrates the angles of the micromirrors of the micromirror array.

FIG. 9 is a horizontal view as seen from a surface in an S direction of micromirrors 151-i (i=1, 2, . . . , N) disposed in the micromirror array 74 (hereafter, when the individual micromirrors 151-i (i=1, 2, . . . , N) do not need to be distinguished, they will simply be referred to as micromirrors 151). The solid lines in the figure refer to the directions in which spectrum portions are reflected by the micromirrors 151 that are controlled to an on setting, and the dotted lines refer to the directions in which spectrum portions are reflected by the micromirrors 151 that are controlled to an off setting. As shown in FIG. 9, the micromirrors 151 are disposed at an equal interval. As mentioned later with reference to FIG. 10, the individual micromirrors 151 have their angles previously adjusted so as to differ slightly from each other with respect to a base in order to reflect the incident spectrum in the on setting at predetermined angles.

Figure 10:
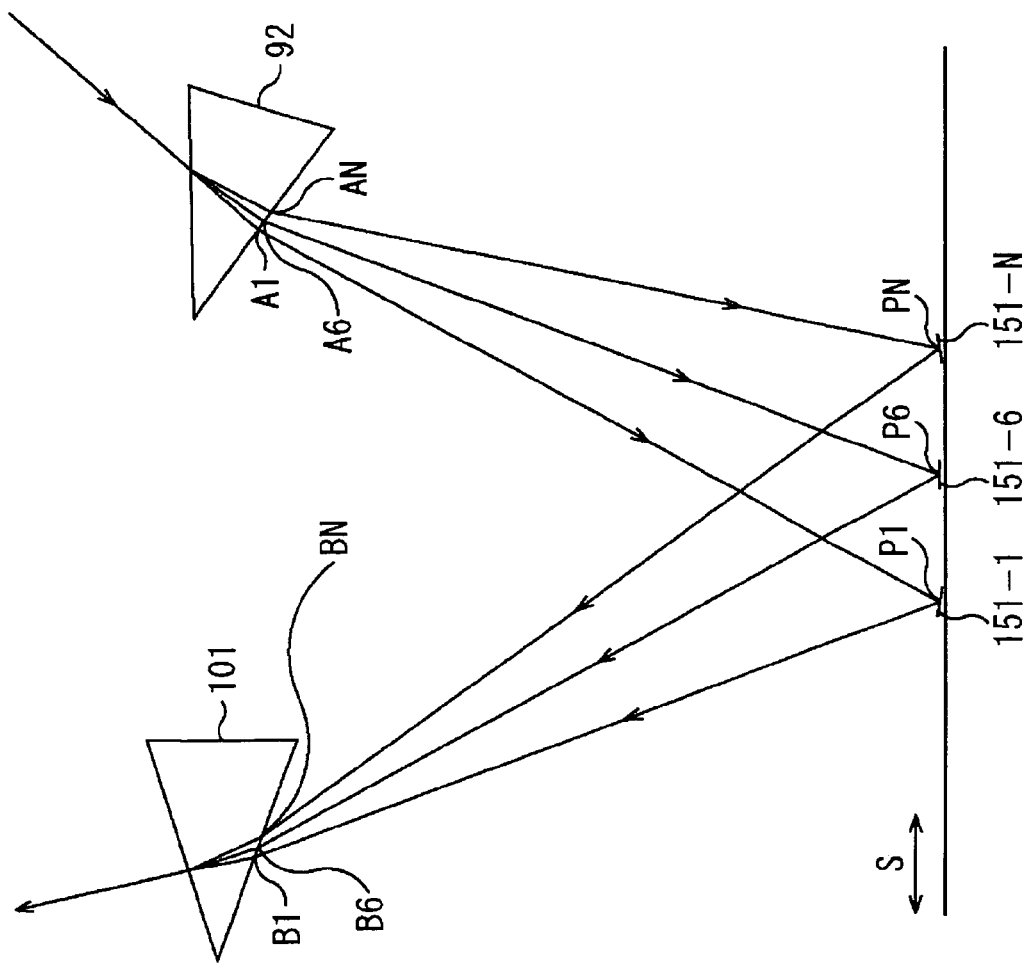
FIG. 10 illustrates the angles of the micromirrors of the micromirror array.

FIG. 10 schematically shows the relationship between incident spectrum and spectrum portions that are reflected for the micromirrors 151-1, 151-6, and 151-N shown in FIG. 9. Similarly to FIG. 9, FIG. 10 is a horizontal view as seen from a surface of the micromirror array 74 in the S direction.

When the white light is incident upon the prism 92, the white light is divided into its spectrum by the prism 92 and impinges upon different micromirrors 151 due to the wavelengths of the spectrum. At this time, the position of the white light incident upon the incident surface of the prism 92 and the refractive index of the prism 92 with respect to the light of each wavelength are constant. Accordingly, the path that the light having the wavelengths takes to impinge upon the micromirror 151 is constant, so that it can be easily calculated. In addition, the refractive index of the prism 101 with respect to the light having the wavelengths is constant. Accordingly, it is possible to calculate where and at what angle the light having the wavelengths should impinge upon the incident surface of the prism 101 in order to form one linear light beam by synthesizing the spectrum portions of the reflection light at a predetermined location of the light exiting surface of the prism 101.

Therefore, where and at what angle each spectrum wavelength exits from the light exiting surface of the prism 92 and where and at what angle each spectrum portion having its associated wavelength is incident upon the incident surface of the prism 101 are determined. In accordance therewith, the angles of the micromirrors 151 are determined. For example, when the spectrum to be incident upon the micromirror 151-1 shown in FIG. 10 is adjusted so as to exit from a point A1 of the light exiting surface of the prism 92, to be reflected at a point P1 of a surface of the micromirror 151-1, and to be incident upon a point B1 of the incident surface of the prism 101, the angle is determined so that the surface of the micromirror 151-1 is perpendicular to a bisector of an angle A1P1B1.

Similarly, when the spectrum to be incident upon the micromirror 151-6 shown in FIG. 10 is adjusted so as to exit from a point A6 of the light exiting surface of the prism 92, to be reflected at a point P6 of a surface of the micromirror 151-6, and to be incident upon a point B6 of the incident surface of the prism 101, the angle is determined so that the surface of the micromirror 151-6 is perpendicular to a bisector of an angle A6P6B6. When the spectrum to be incident upon the micromirror 151-N shown in FIG. 10 is adjusted so as to exit from a point AN of the light exiting surface of the prism 92, to be reflected at a point PN of a surface of the micromirror 151-N, and to be incident upon a point BN of the incident surface of the prism 101, the angle is determined so that the surface of the micromirror 151-N is perpendicular to a bisector of an angle ANPNBN.

The reflection light (display image scanning line) in which the spectrum portions have been synthesized by the prism 101 is condensed by the lens system 102 (a light-condensing system including a cylindrical lens, a parabolic mirror, etc.) which is a combination of a plurality of lenses like the lens system 61 of the sensing device 31, and impinges upon and is reflected by the galvano-mirror 78.

Here, since the lens system 61 of the sensing device 31 and the lens system 102 of the display device 34 have the same structure, it is possible to reduce the influence of chromatic aberration of the lens systems.

Similarly to the galvano-mirror 41 of the sensing device 31, the galvano-mirror 78 is a deflector for adjusting (deflecting) the direction of reflection of light (display image scanning line) incident upon one planar mirror which is disposed at a rotary shaft (not shown) and which rotates around the rotary shaft by a controlling operation of the oscillator 80. The galvano-mirror 78 is disposed so as to rotate vertically with respect to the screen 111 of the light exiting section 79.

The light exiting section 79 is formed of a black box (not shown) surrounding the screen 111 and the galvano-mirror 78. The display image scanning line that has been condensed by the lens system 102 and reflected by the galvano-mirror 78 is focused and projected on the screen 111 of the light exiting section 79. This causes one elongated scanning line to be displayed in the horizontal direction of the screen 111. The black box (not shown) is effective in improving contrast ratio of an image on the screen 111. When a sufficient contrast can be obtained, the black box may be omitted.

The image is displayed on the screen 111 in the following timing. In other words, the driver 76 obtains one scanning line of image data every horizontal scanning period H, and performs the on/off setting (including the on/off time) control on the output of the reflection light at the micromirrors 151 of the micromirror array 74 on the basis of the obtained image data. The oscillator 80 moves in response with the control of the exiting of the reflection light at the micromirror array 74, adjusts the angle of the galvano-mirror 78, and projects display image scanning lines so as to be successively displaced downward from each other on the screen 111. f display image scanning lines forming one frame are projected onto the screen 111 during the vertical scanning period T, thereby displaying one frame of image on the screen 111.

Figure 11:
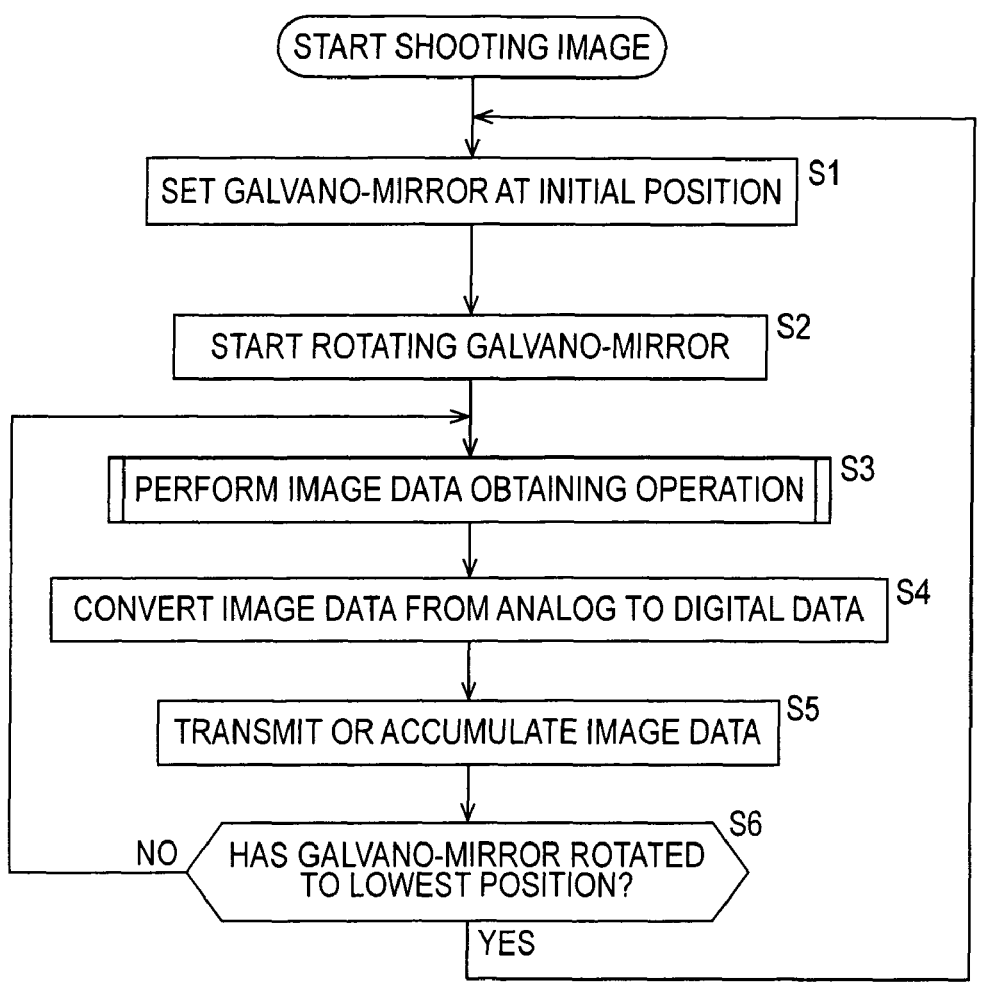
FIG. 11 is a flowchart illustrating an image shooting process at the sensing device.

Next, the image projection process at the sensing device 31 will be described with reference to the flowcharts in FIGS. 11 and 12. The process is started when a user orders a shooting operation to be started and ends when the user orders the shooting operation to be ended.

In Step S1, the oscillator 47 sets the galvano-mirror 41 to an initial position. In other words, the galvano-mirror 41 is set at a reference position where the topmost line in the horizontal direction in a range (frame) in which an optical image of an object reflected by the galvano-mirror 41 is picked up is separated by the slit 42.

In Step S2, the oscillator 47 starts rotating the galvano-mirror 41. The galvano-mirror 41 is rotated at a constant speed so that the entire optical image of the object to be picked up passes downward through the slit 42 every vertical scanning period T.

Figure 12:
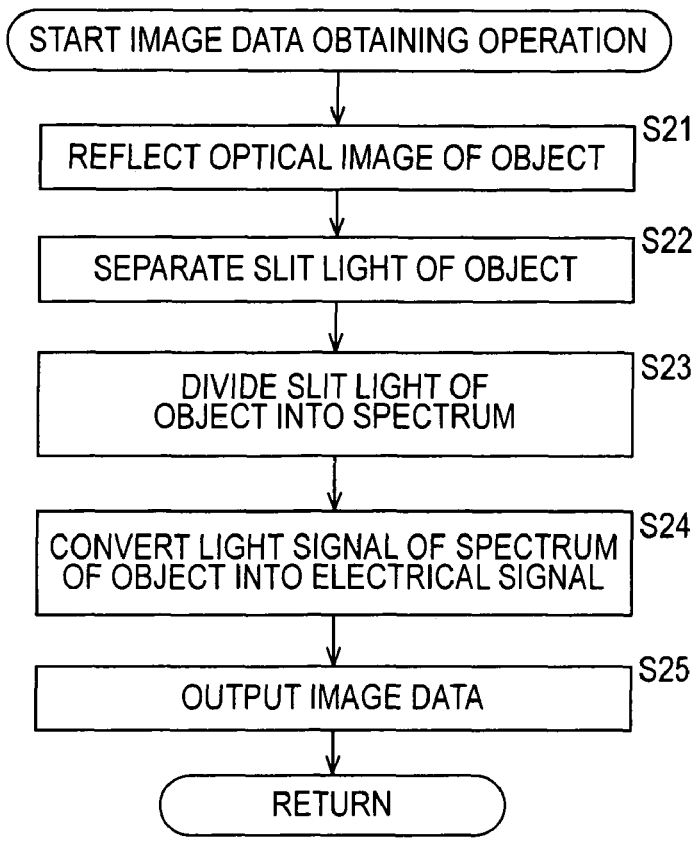
FIG. 12 is a flowchart illustrating in detail an image data obtaining operation in Step S3 shown in FIG. 11.

In Step S3, an image data obtaining operation described later with reference to FIG. 12 is performed. By this operation, as described above with reference to FIGS. 3 and 8, one scanning line of image formed by slit light of the object separated by the slit 42 is divided into M pixels, and the pixels are detected as N spectral components having wavelengths in the visible light range (wavelengths from 380 nm to 780 nm), so that the image is output by pixel. In this case, image data of the topmost line, in the horizontal direction of the frame, of the optical image of the object to be picked up, that is, image data of the topmost scanning line is output.

In Step S4, the A/D converter 45 converts the image data output by the light sensor 44 in the operation of Step S3 from analog data into digital data. In other words, the image data is converted into n-bits of digital data on the basis of the size (level) of each pixel of the image data output by the operation in Step S3. That is, the image data is divided into N spectral components per pixel, and the divided spectral components are represented as n bits of digital data in accordance with their strengths, so that one pixel represents N×n bits of data.

In Step S5, the A/D converter 45 supplies the digital image data to the output section 46. When the output section 46 is to display on the display device 34 in real time the image data that has been picked up on the basis of the command of the user, the image data is output to the transmitter 32. When the image data is to be recorded, the image data is output to and is accumulated at the accumulator 33.

In Step S6, the oscillator 47 determines whether or not the galvano-mirror 41 has rotated to the lowest reference position. In other words, it determines whether or not the galvano-mirror 41 has rotated to a location where the lowest line, in the horizontal direction of the frame, of the optical image of the object that is picked up is separated by the slit 42. In this case, the galvano-mirror 41 is set at a position where the topmost line, in the horizontal direction of the frame, of the optical image of the object that is picked up is separated by the slit 42. Therefore, it determines that the galvano-mirror 41 has not rotated to the lowest reference position, so that the process returns to Step S3.

Thereafter, until the oscillator 47 determines that the galvano-mirror 41 has rotated to the lowest reference position in Step S6, the operations from Steps S3 to S6 are repeated a total of f times (corresponding to the number of vertical scanning lines), so that one frame of the optical image of the object is divided into f horizontal lines (scanning lines) and picked up. The operations from Steps S3 to S6 are repeated at an interval corresponding to the horizontal scanning period H.

When the oscillator 47 determines that the galvano-mirror 41 has rotated to the lowest position in Step S6, the process returns to Step S1, so that the galvano-mirror 41 is set at the initial position and the operations subsequent to this setting operation are repeated. In other words, the second frame and subsequent frames of the optical image of the object are picked up. When the operation in Step S1 is performed for the second time and subsequent times, the time required for setting the galvano-mirror 41 at the initial position is equal to the aforementioned return time α, the operations from Steps S1 to S6 are repeated at an interval corresponding to the vertical scanning period T including the return time α, and the picking up of every one frame of image is repeated, so that a plurality of frames of the image are obtained.

In this way, the optical image of the object is divided into f horizontal scanning lines, and one scanning line of image data is divided into M pixels. The pixels are detected as N spectral components having wavelengths in the visible light range (wavelengths from 380 nm to 780 nm), so that the optical image is output by pixel (the optical image of the object is picked up).

Next, the image data obtaining operation in Step S3 shown in FIG. 11 will be described in more detail with reference to FIG. 12. This operation is executed every horizontal scanning period H.

In Step S21, the optical image of the object that is picked up is incident upon the galvano-mirror 41 of the sensing device 31 and is reflected towards the slit 42.

In Step S22, the optical image of the object reflected by the galvano-mirror 41 by the operation in Step S21 passes through the slit 42, so that one horizontal elongated linear light beam of the object (slit light of the object) is separated.

In Step S23, the slit light of the object separated in Step S22 is divided into a spectrum by the light divider 43. The slit light of the object that has passed through the lens system 61 of the light divider 43 passes through the prism 62, so that the slit light is divided into a spectrum and the spectrum is focused on the surface of the light sensor 44.

In Step S24, the light sensor 44 converts light signal of the object spectrum that has impinged upon the light sensor 44 into an electrical signal. As mentioned above with reference to FIG. 8, in the light sensor 44, M electron shock CCDs 121 and N electron shock CCDs 121 are disposed in the x direction and the S direction, respectively, in a plane and in a lattice form within a rectangular area. By this, the object spectrum is divided into M pixels in the x direction, and each pixel is divided into N spectral components having wavelengths in the visible light range (wavelengths from 380 nm to 780 nm). The electron shock CCDs 121 convert light to electrons (electrical charges) by photoelectric effect in accordance with the strength (luminance) of the incident spectrum.

In Step S25, the light sensor 44 outputs as image data the electrical signal produced by the electrical charges accumulated at the electron shock CCDs 121 to the A/D converter 45.

Figure 13:
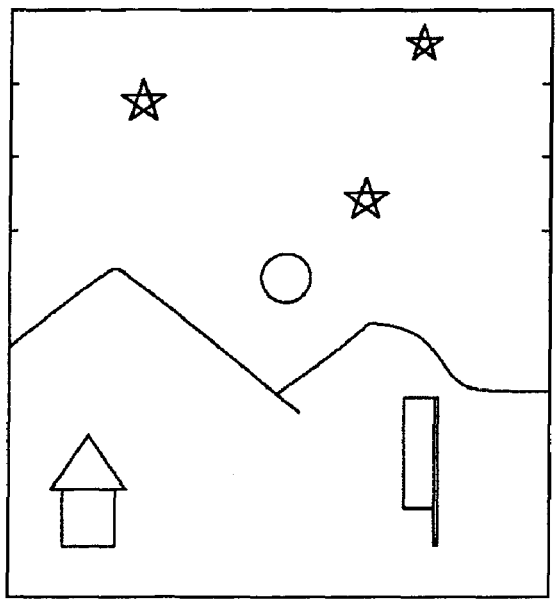
FIG. 13 shows an example of an image of an object.
Figure 14:
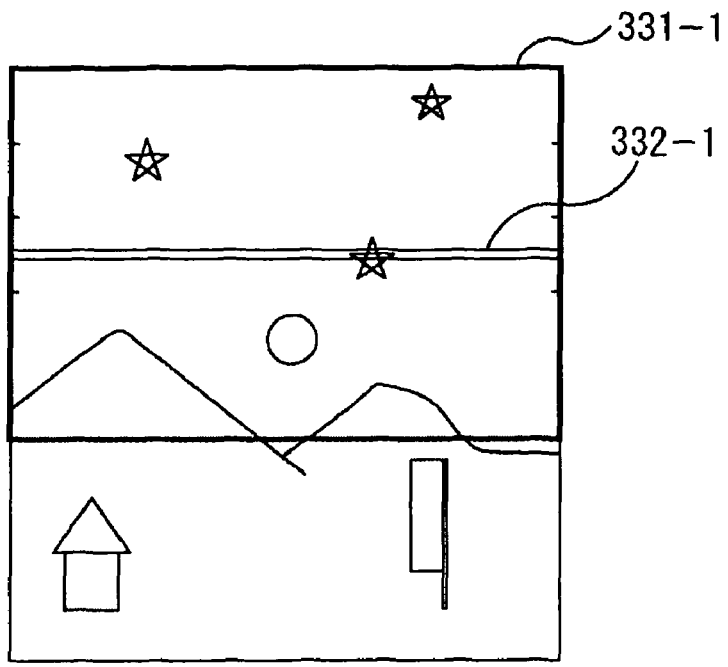
FIG. 14 shows an example of the image by slit light.

The slit light of the object is as illustrated from FIGS. 13 to 17. FIG. 13 shows the entire image of the object. When the galvano-mirror 41 is orientated relatively upward at a first angle, as shown in FIG. 14, the galvano-mirror 41 takes in an image of an image frame 331-1 defined by the size of the galvano-mirror 41. The light sensor 44 takes in a slit image portion 332-1 of the image through the slit 42.

Figure 15:
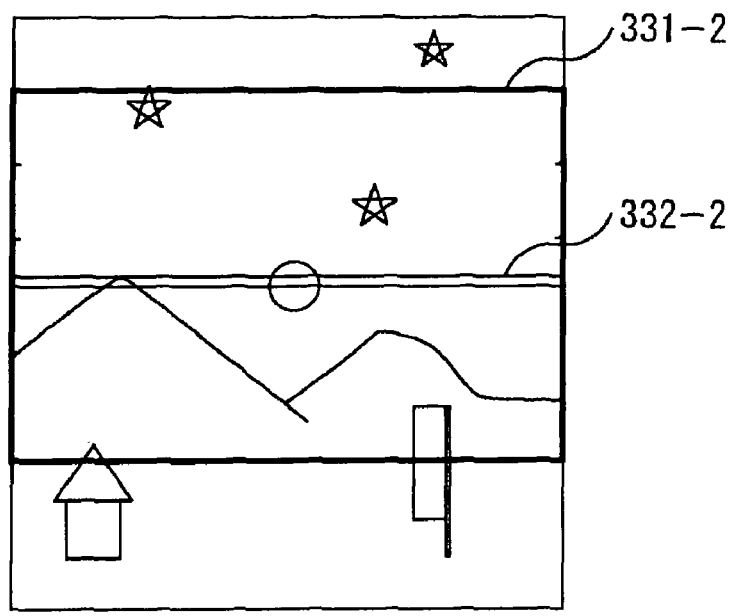
FIG. 15 shows another example of the image by slit light.
Figure 16:
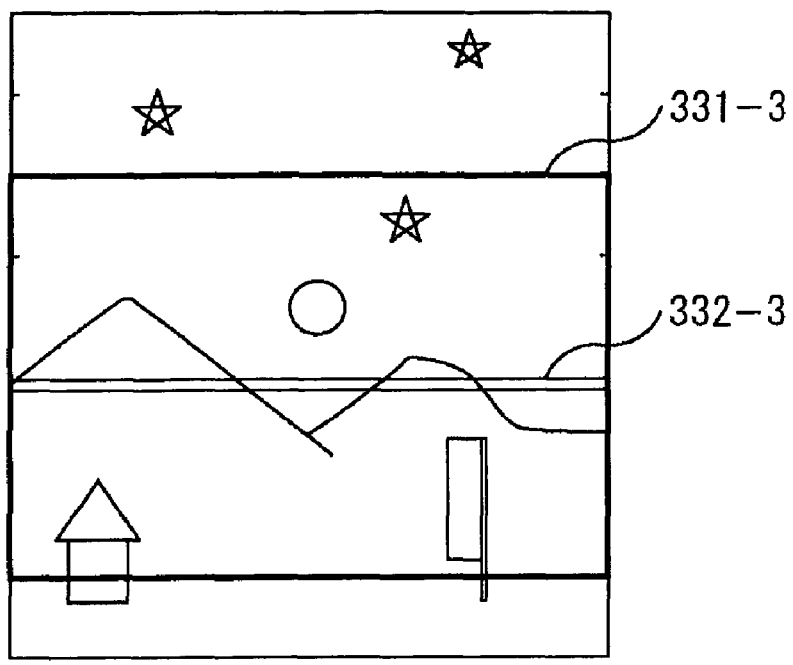
FIG. 16 shows still another example of the image by slit light.
Figure 17:
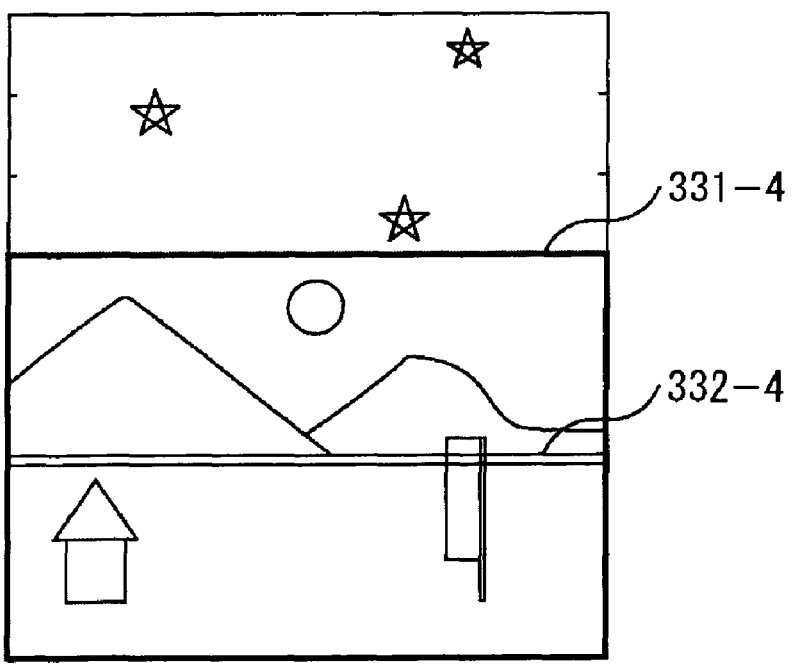
FIG. 17 shows still another example of the image by slit light.

When the galvano-mirror 41 is oriented downward than in the case shown in FIG. 14, the galvano-mirror 41 takes in an image of an image frame 331-2 as shown in FIG. 15. The light sensor 44 takes in a slit image portion 332-2 of the image through the slit 42. Thereafter, when the galvano-mirror 41 is oriented further downward and, as shown in FIG. 16, an image of an image frame 331-3 is detected, the light sensor 44 takes in a slit image portion 332-3 of the image. When the galvano-mirror 41 is further oriented downward, as shown in FIG. 17, the light sensor 44 detects a slit image portion 332-4 of an image of an image frame 331-4.

In this way, the spectrum of the slit light of the object is divided into M pixels, and each pixel is divided into N spectral components having wavelengths in the visible light range (wavelengths from 380 nm to 780 nm), so that an electrical signal based on the luminance of every divided spectral component is output. In other words, the distribution and strengths of the spectrum of the optical image of the object are detected as they are, so that image data converted into electrical signals is output.

Next, image display at the display device 34 will be described with reference to FIGS. 18 and 19. This process is started when a user orders the image display to be started and ends when the user orders the image display to end.

In Step S51, the oscillator 80 sets the galvano-mirror 78 to an initial position. In other words, the galvano-mirror 78 is set at a position where a scanning line of a display image reflected by the galvano-mirror 78 is projected as a topmost scanning line on the screen 111.

In Step S52, the driver 76 obtains one scanning line of image data of an image to be displayed from the transmitter 32 or the accumulator 33 through the input section 75. In other words, in this case, it obtains the image data of the topmost scanning line of the first frame.

Figure 19:
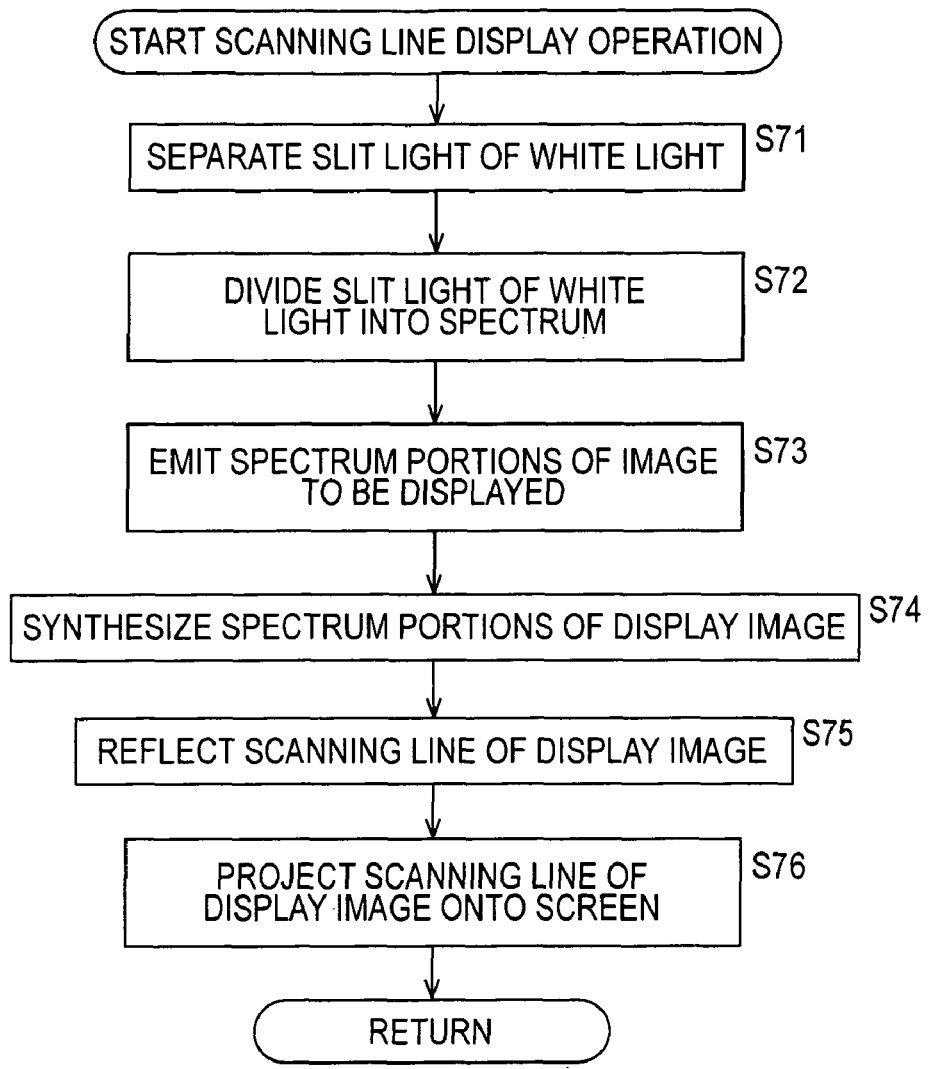
FIG. 19 is a flowchart illustrating in detail a scanning line display operation in Step S53 shown in FIG. 18.

In Step S53, a scanning line display operation described later with reference to FIG. 19 is carried out. By this operation, the image (scanning line) based on the one scanning line of image data obtained in Step S52 is displayed on the screen 111. In other words, in this case, the topmost scanning line of the image of the first frame is displayed on the screen 111.

In Step S54, the oscillator 80 determines whether or not the last (lowest) scanning line of the one frame has been displayed. In other words, it determines whether or not the galvano-mirror 78 has been set at a position where the lowest scanning line is displayed on the screen 111. In this case, since the galvano-mirror 78 is set at the position where the topmost scanning line is displayed on the screen 111, the oscillator 80 determines that the last scanning line of the one frame is not displayed, so that the; process proceeds to Step S55.

In Step S55, the oscillator 80 rotates (adjusts) the galvano-mirror 78 so as to be positioned where the next scanning line, in this case, the second scanning line is displayed on the screen 111, and the process returns to Step S52.

Thereafter, in Step S54, until the oscillator 80 determines that the last scanning line of the one frame has been displayed, the operations from Steps S52 to S55 are repeated a total of f times (corresponding to the number of vertical scanning lines), so that f scanning lines included in the one frame of image are displayed. The operations from Steps S52 to S55 are repeated at an interval corresponding to the horizontal scanning period H.

When, in Step S54, the oscillator 87 determines that the last scanning line of the one frame has been displayed, the process returns to Step S51 to set the galvano-mirror 78 at the initial position and the operations subsequent to this setting operation are repeated. In other words, images of the second frame and subsequent frames are displayed. When the operation in Step S51 is performed for the second time and subsequent times, the time required for setting the galvano-mirror 78 at the initial position is equal to the aforementioned return time $\alpha$, the operations from Steps S51 to S56 are repeated at an interval corresponding to the vertical scanning period T including the return time $\alpha$, and the display of every one frame of image is repeated.

In this way, an image of the image data that has been picked up by the sensing device 31 is displayed on the screen 111.

Next, the scanning line display operation of Step S53 shown in FIG. 18 will be described in more detail with reference to FIG. 19.

In Step S71, white light emitted by the light source 71 passes through the slit 72 so that one elongated linear light beam (slit light of the white light) is separated from the white light.

In Step S72, the slit light separated from the white light in Step S71 is divided into a spectrum by the prism 92 of the light divider 73, so that the spectrum of the divided white light is temporarily focused on a surface of the micromirror array 74.

In Step S73, the driver 76 controls the on/off setting (including the on/off time) of the output of the reflection light of the micromirrors 151 of the micromirror array on the basis of the image data obtained by the operation in Step S52, extracts spectrum portions based on the image data from the spectrum of the incident white light obtained in Step S72, and causes the exiting of (reflects) the spectrum portions that are the same as the spectrum of the image to be displayed.

As mentioned above, basically, the number and arrangement of the micromirrors 151 of the micromirror array 74 are the same as those of the electron shock CCDs 121 of the light sensor 44 shown in FIG. 8. The micromirror array 74 is disposed so that the spectrum of the white light incident upon the micromirrors 151 are the same as the object spectrum incident upon the electron shock CCDs 121 disposed at corresponding locations within the lattice of the light sensor 44. The electron shock CCDs 121 and the micromirrors 151 that are disposed in corresponding locations within the lattice are in a one-to-one correspondence. The on/off setting (including the on/off time) of the output of the reflection light at the mircromirrors 151 is controlled on the basis of the image data output from the respective electron shock CCDs 121.

The on/off setting (on/off time) of the output of the reflection light at the micromirrors 151 is controlled by a subfield method. For example, if one unit of image data is represented as 4-bit image data (that is, when each spectrum value is expressed as 4 bits (when n=4)), the time resulting from equally dividing the horizontal scanning period H into 16 (4th power of 2) parts is defined as one unit time (hereafter referred to as "unit time"). By each bit value of the image data, during a period in decimal notation expressed by the unit time×each bit, the driver 76 turns on or off the output setting of the reflection light at the micromirrors 151. For example, if the value of the image data (one spectral value) is 1010 in binary notation, during the horizontal scanning period H, the micromirror 151 corresponding to this spectrum value is first set on for 8 unit times (=third power of 2 or the decimal notation value of the binary notation value 1000), then is set off for 4 unit times (=second power of 2 or the decimal notation value of the binary notation value 100), then is set on for 2 unit times (=first power of 2 or the decimal notation value of the binary notation value 10), and is finally set off for one unit time (=zeroth power of 2 or the decimal notation value of the binary notation value 1).

In this way, by controlling the on/off time of the output of the reflection light at each micromirror 151 every horizontal scanning period H on the basis of the image data value (luminance of the light incident upon the electron shock CCD 121), the luminance of the spectrum of the reflection light exiting from the micromirror array 74 is controlled. Since each micromirror 151 is such that the on/off setting of the reflection of the spectrum portions that are the same as the spectrum incident upon the corresponding electron shock CCD 121 is controlled, the spectrum portions that are the same as the spectrum of the optical image incident upon the light sensor 44 when the image data is obtained is extracted from the spectrum of the white light and exit from the micromirror array 74.

In Step S74, the spectrum portions of the reflection light exiting from the micromirror array 74 in Step S73 are synthesized as a result of the spectrum portions passing through the prism 101, so that one elongated linear light beam (display image scanning line) is formed at the upper surface (light exiting surface) of the prism 101. The display image scanning line becomes light having the same components (including brightness) as the slit light of the object that has impinged upon the upper surface (incident surface) of the prism 62 of the sensing device 31 when the image data of the image to be displayed (image data used for a controlling operation when the spectrum portions of the reflection light on which the linear light beam is based are output from the micromirror array 74) is detected by the sensing device 31.

In Step S75, the display image scanning line formed by synthesizing the spectrum portions in Step S74 is condensed by the lens system 102, impinges upon the galvano-mirror 78, and is reflected towards the screen 111.

In Step S76, the display image scanning line that has been reflected in Step S75 is focused and projected on the screen 111, so that one horizontal scanning line is displayed on the screen 111.

Figure 18:
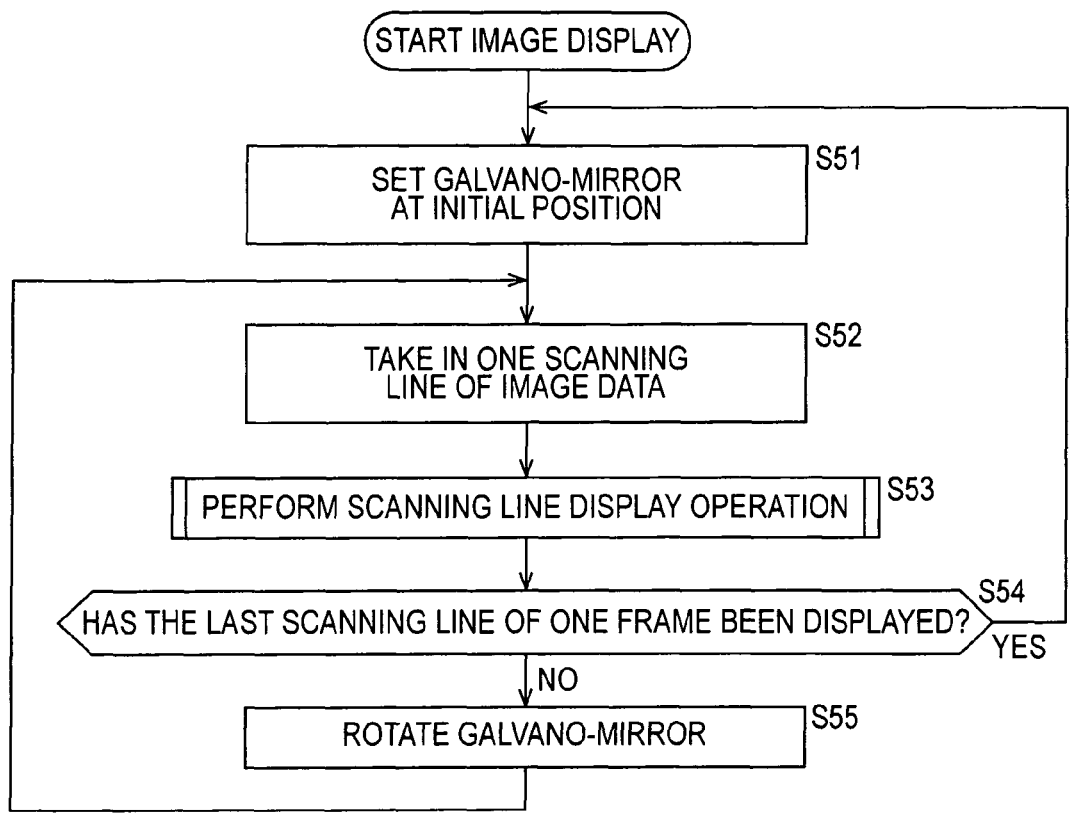
FIG. 18 is a flowchart illustrating an image display process at the display device.

By the above-described operations in FIGS. 18 and 19, the image of the object that has been picked up at the sensing device 31 is displayed on the screen 111 of the display device 34 on the basis of the image data of the object that has been picked up.

Accordingly, the image processing system 21 can faithfully pick up the colors of an object and can display an image formed by faithfully reproducing the colors of an optical image of the object on the basis of picked-up image data.

Although, in the foregoing description, the micromirror array 74 is used in the display device 34, a reflection liquid crystal display (LCD) which, like the micromirror array 74, uses outside light (natural light) for the light source, and projects reflection outside light onto, for example, a screen may be used. Even in this case, the liquid crystal reflectivity or reflection time are controlled on the basis of image data.

Figure 20:
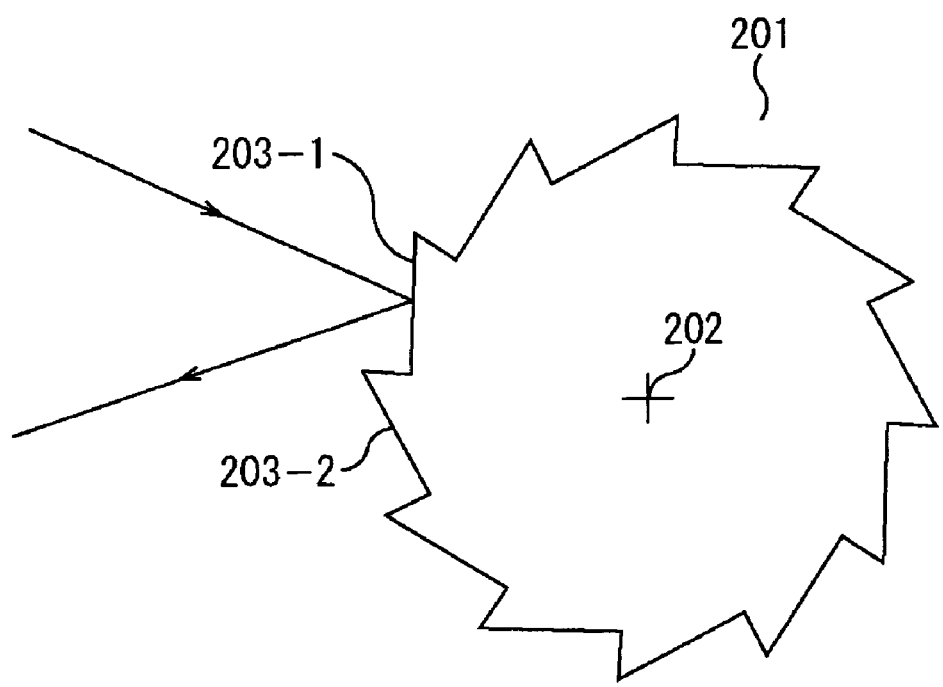
FIG. 20 shows an example of a form of a galvano-mirror.

For the galvano-mirror 41 of the sensing device 31 and the galvano-mirror 78 of the display device 34, a galvano-mirror 201 having the form shown in FIG. 20 may be used instead of a planar mirror which rotates around the center of a rotary shaft. The galvano-mirror 201 rotates at a constant speed in a constant direction around the center of a central axis 202. For example, when incident light is impinging upon a surface 203-1 of the galvano-mirror 201, the rotation of the galvano-mirror 201 causes the angle of the surface 203-1 with respect to the incident light to change, so that the angle of the reflected light also changes continuously. When the galvano-mirror 201 has rotated to a certain angle, the incident light which has been impinging upon the surface 203-1 starts impinging upon a surface 203-2, and the angle of the reflected light becomes the same as the initial angle when the incident light was impinging upon the surface 203-1. Thereafter, further rotation of the galvano-mirror 201 at the constant speed causes the angle of the reflected light to change continuously as in the case in which the incident light was impinging upon the surface 203-1. By this, it is possible to adjust the angle of the reflected light in a constant period, so that the same effects as those when a planar galvano-mirror is rotated at a constant speed and is returned to its initial position when the planar galvano-mirror has rotated to a predetermined angle can be provided.

Instead of a galvano-mirror, it is possible to use a polygon mirror used in, for example, a laser printer.

By detecting and displaying a spectrum of wavelengths outside the visible light range (wavelengths from 380 nm to 780 nm) of human beings, it is possible to provide an image that approximates more closely to an object in the real world for living beings other than human beings.

Figure 21:
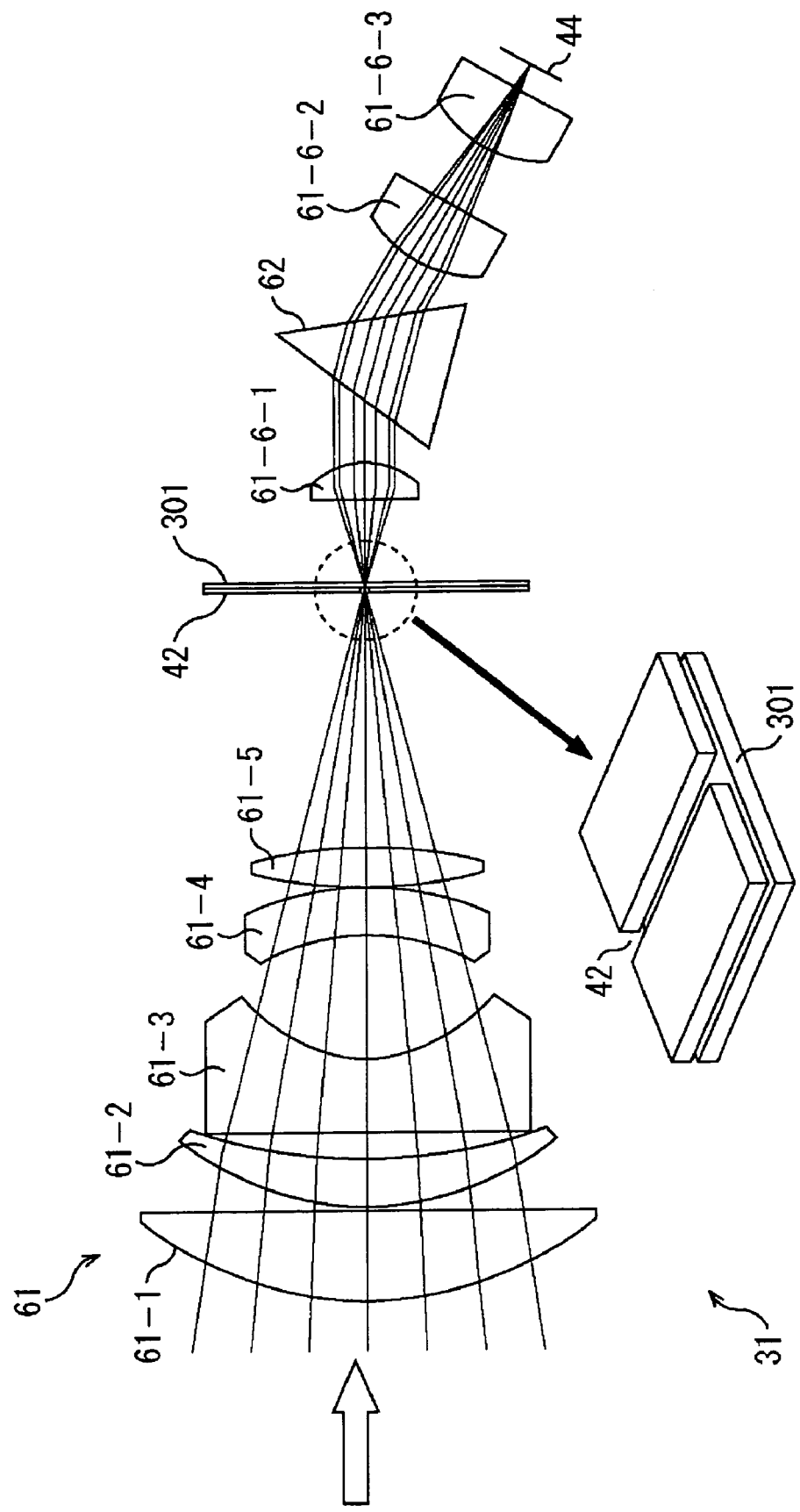
FIG. 21 shows a sensing device of another structure.

FIG. 21 shows a sensing device 31 of another form. In this form, a slit 42 disposed downstream in a light path from the lens system 61 is formed perpendicular to the plane of the figure. The lens system 61 comprises lenses 61-1 to 61-5, and the slit 42 is disposed at a focus of the lens system 61. A diffuser 301 is disposed just behind the slit 42. Accordingly, an image of an object is focused at the diffuser 301. Although, in FIG. 21, only light passing through the slit 42 is shown, light is also focused on portions of the diffuser 301 other than where the slit 42 is located. However, such light is shielded, so that only the light that is focused in correspondence with the slit 42 is extracted. Although the diffuser 301 need not be used, disposing the diffuser 301 just behind the slit 42 makes it possible to restrict diffraction by the slit 42.

An aplanatic lens system 61-6 comprising lenses 61-6-1 to 61-6-3 is disposed between the diffuser 301 and the light sensor 44. A prism 62 is disposed between the lens 61-6-1 and the lens 61-6-2. The lens 61-6-1 converts incident light from the diffuser 301 into parallel light and causes the parallel light to exit therefrom. Disposing the prism 62 in a parallel light path reduces chromatic aberration, and facilitates the designing of the optical system including the prism 62. Therefore, the parallel light is incident upon the prism 62. The lens 61-6-2 converts the parallel light back into converging light. The converging light is focused on the light sensor 44 through the lens 61-6-3. In other words, the lens system 61 is disposed so that an image of the slit 42 is focused on the light sensor 44.

Even in such an arrangement, any of the slit image portions 332-1 to 332-4 shown in FIGS. 14 to 17 is focused on the diffuser 301 and, thus, the light sensor 44.

Figure 22:
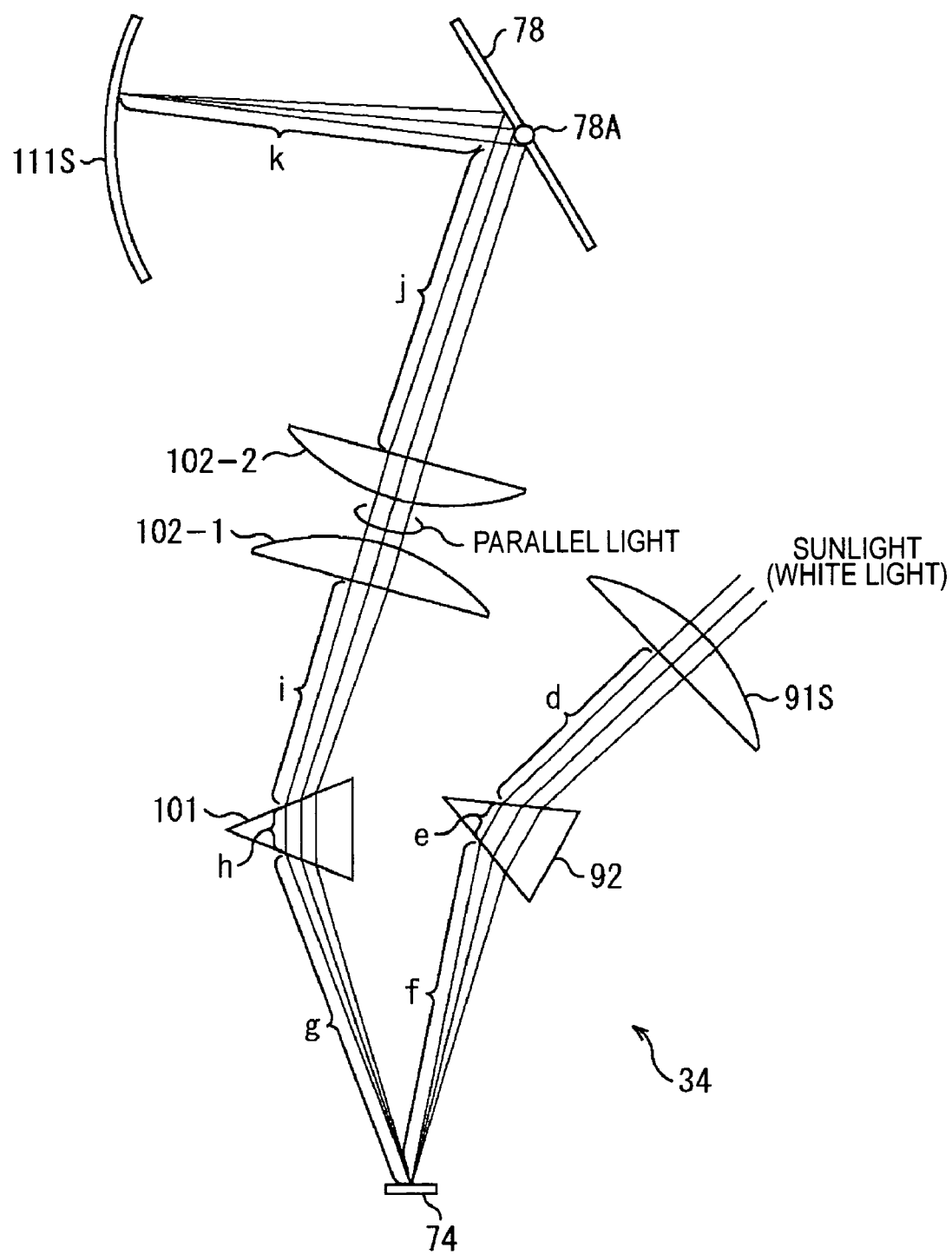
FIG. 22 shows a display device of another structure.

FIG. 22 shows a display device 34 of another form. In the display device 34, a cylindrical lens 91S serving as the lens system 91 is used instead of the slit 72. As in the case shown in FIG. 6, both the slit 72 and the lens system 71 may be used. Therefore, white light emitted from the light source 71 is condensed by the cylindrical lens 91S, so that a spectrum of the light divided by a prism 92 is as a thin straight light beam (emission light) focused on a micromirror array 74 (a direction perpendicular to the plane of the figure corresponds to the its lengthwise direction). The focal length of the cylindrical lens 91S is equal to the sum of a distance d between the cylindrical lens 91S and the prism 92, a light path length (thickness) e of the prism 92, and a distance f between the prism 92 and the micromirror array 74 (that is, d+e+f).

Spectrum portions reflected by the micromirror array 74 on the basis of image data are synthesized by a prism 101 and impinge upon a cylindrical screen 111S through a galvano-mirror 78.

The focal length of a convex lens 102-1 is equal to the sum of a distance i between the convex lens 102-1 and the prism 101, a light path length (thickness) h of the prism 101, and a distance g between the prism 101 and the micromirror array 74 (that is, i+h+g). The micromirror array 74 is disposed at the focal length of the convex lens 102-1. Therefore, light exiting from the micromirror array 74 is converted into parallel light by the convex lens 102-1. The focal length of a convex lens 102-2 is equal to the sum of a distance j between the convex lens 102-2 and a galvano-mirror 78 and a distance k between the galvano-mirror 78 and the cylindrical screen 111S (that is, j+k). Therefore, light exiting from the convex lens 102-2 is reflected by the galvano-mirror 78 and is focused on the cylindrical screen 111S.

As shown in FIG. 22, the cross section of the cylindrical screen 111S that is parallel to the plane of the figure is curved with a curvature radius k (that is, the galvano-mirror 78 is disposed so that its rotary shaft 78A is disposed at the center of the curvature radius k of the cylindrical screen 11S), while the cylindrical screen 111S is not curved in a direction perpendicular to the plane of the figure. Rotation of the galvano-mirror 78 around the center of the rotary shaft 78A causes the position of projection of a linear scanning line on the cylindrical screen 111S to change successively. By this, an image is displayed on the cylindrical screen 111S without distortion.

In this way, when the lens system 91 is used instead of the slit 72, compared to the case in which the slit 72 is used, it is possible to more effectively condense light and to display a brighter image. If the slit 72 and the lens system 91 are both used, a thinner linear light beam can be produced.

Figure 23:
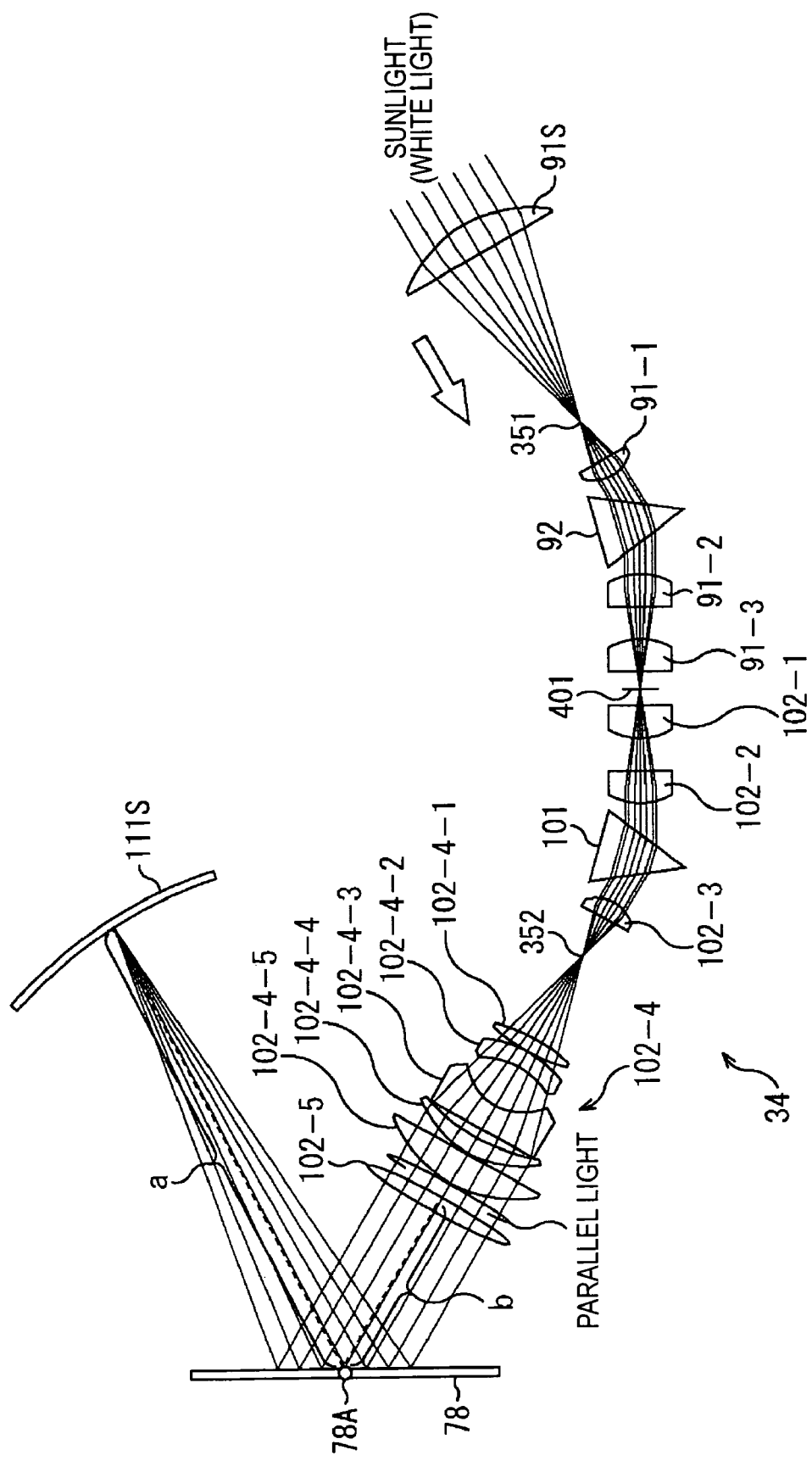
FIG. 23 shows a display device of still another structure.

FIG. 23 is a display device 34 of still another form. In this form, a lens system 91 is an aplanatic lens system including lenses 91-1 to 91-3, in addition to a cylindrical lens 91S. A prism 92 is disposed in a parallel light path between the lenses 91-1 and 91-2. In addition, in this form, a transmissive LCD 401 is used instead of the micromirror array 74. White light emitted from a light source 71 is temporarily focused as an emission line 351 by the cylindrical lens 91S. Light from the emission line 351 is dispersed again and converted into parallel light by the lens 91-1. Then, the light impinges upon the prism 92 and is divided into a spectrum there. The spectrum is formed into converging light again by the lens 91-2 and is focused onto the LCD 401 through the lens 91-3. Therefore, an image of the emission line 351 is formed on the LCD 401.

The light that has passed through the LCD 401 whose transmission setting (transmittance ratio or time) is controlled on the basis of image data is formed into an emission line 352 by an aplanatic lens system including lenses 102-1, 102-2, and 102-3. The lenses 102-1 to 102-3 also form the aplanatic lens system, and a prism 101 is disposed in a parallel light path between the lenses 102-2 and 102-3. Therefore, spectrum portions emitted from the LCD 401 impinge upon the prism 101 through the lenses 102-1 and 102-2, are synthesized at the prism 101, and are focused by the lens 102-3, so that an image of the emission line 351 is formed as the emission line 352.

The light emitted from the emission line 352 is converted into parallel light by a telecentric lens unit 102-4 comprising lenses 102-4-1 to 102-4-5, and then impinges upon a thin convex lens 102-5. The sum of a distance b between the thin convex lens 102-5 and a galvano-mirror 78 and a distance a between the galvano-mirror 78 and a cylindrical screen 111S (that is, b+a) is considered as the focal length of the thin convex lens 102-5. In other words, the cylindrical screen 111S is disposed at the focal length (b+a) of the thin convex lens 102-5. a is also the curvature radius of the cylindrical screen 111S. Therefore, an image is displayed on the cylindrical screen 111S without any distortion.

The telecentric lens unit 102-4 and the thin convex lens 102-5 may be formed by zoom lenses.

Figure 24:
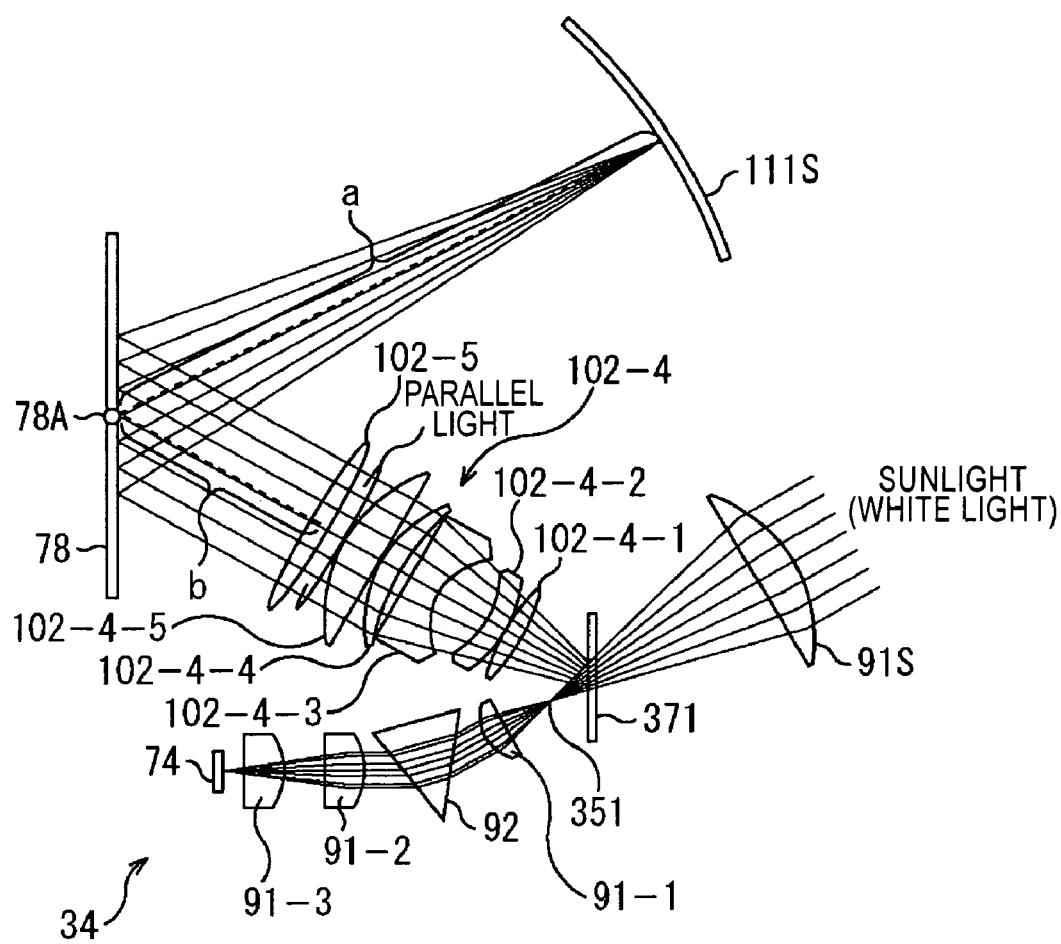
FIG. 24 shows a display device of still another structure.

FIG. 24 shows a display device 34 of still another form. In the form shown in FIG. 23, since the light path from the cylindrical lens 91S to the galvano-mirror 78 is formed in a straight line, the overall length is long. Therefore, in the form shown in FIG. 24, the display device 34 is designed so that it can be reduced in size by reducing the overall length of the display device 34. More specifically, in this form, a half mirror 371 is disposed between a cylindrical lens 91S and an emission line 351. Light emitted from the emission line 351S impinges upon a micromirror array 74, used instead of the LCD 401 shown in FIG. 23, through lenses 91-1 to 91-3. A prism 92 is disposed in a parallel light path between the lenses 91-1 and 91-2.

Spectrum portions exiting from the micromirror array 74 controlled on the basis of image data impinge upon the prism 92 through the lenses 91-3 and 91-2, and are synthesized, so that the emission line 351 is formed through the lens 91-1. Light emitted from the emission line 351 impinges upon and is reflected by the half mirror 371 and is separated from the incident light from the cylindrical lens 91S. The light reflected by the half mirror 371 impinges upon a galvano-mirror 78 through a telecentric lens unit 102-4 and a thin convex lens 102-5. Light reflected by the galvano-mirror 78 impinges upon the cylindrical screen 111S, thereby displaying an image.

Accordingly, in this form, the prism 92 for dividing light into a spectrum is also used as the synthesizing prism 101. In addition, the lenses 91-1 to 91-3 are also used as the lens 101 and lenses 102-1 to 102-3. The other structural features are the same as those in FIG. 23. As a result, fewer parts are used, thereby making it possible to reduce size and costs.

Figure 25:
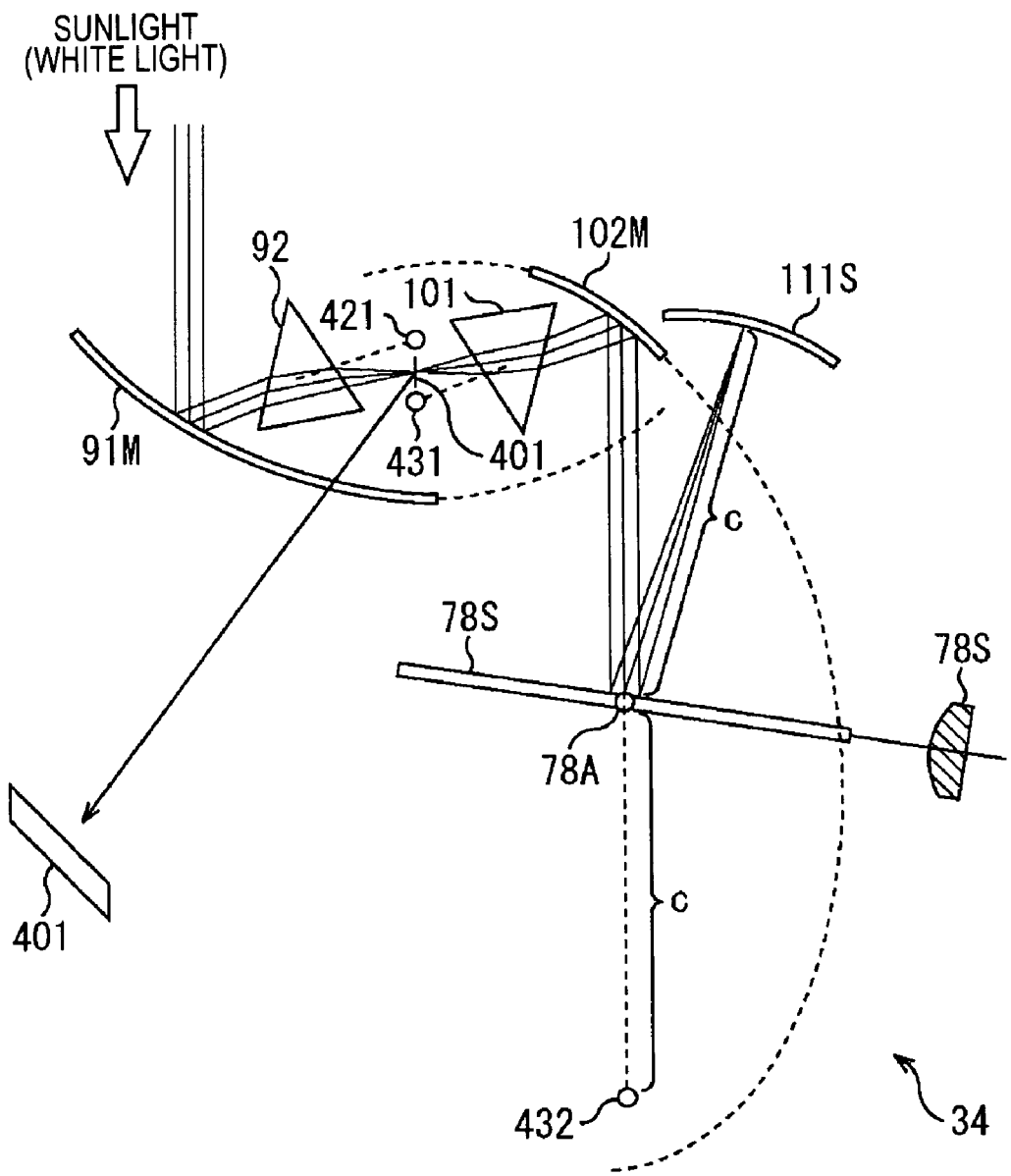
FIG. 25 shows a display device of still another structure.

FIG. 25 shows a display device 34 of still another form. If lenses are used as the lens systems 91 and 102, chromatic aberration occurs. Accordingly, in this form, mirrors are used instead of lenses. More specifically, in this form, a parabolic sweep mirror 91M is used instead of the lens system 91, and an elliptical sweep mirror 102M is used instead of the lens system 102. The parabolic sweep mirror 91M is formed by extending perpendicularly to the plane of the figure a parabolic line which is drawn in the plane of the figure. Similarly, the elliptical sweep mirror 102M has a surface formed by extending perpendicularly to the plane of the figure a line of a portion of an ellipse which is drawn in the plane of the figure.

White light emitted from a light source 71 is reflected by the parabolic sweep mirror 91M. If a prism 92 does not exist, the light is focused as an emission line (defining a focus) at a focus 421 of a parabolic line. However, the prism 92 is actually inserted between the parabolic sweep mirror 91M and the focus 421 of the parabolic line. Therefore, a light path is bent there, causing the light to be actually focused at a transmissive LCD 401 disposed at a position that differs from the position of the focus 421.

If a prism 101 does not exist, the LCD 401 is disposed at a focus 431 of the elliptical sweep mirror 102M. However, the prism 101 is actually disposed between the elliptical sweep mirror 102M and the focus 431, causing a light path to be bent. Therefore, the LCD 401 is disposed at a location that is slightly displaced from the focus 431. In other words, when the prisms 92 and 101 do not exist, the parabolic sweep mirror 91M and the elliptical sweep mirror 102M are disposed so that the focus 421 of the parabolic line and the focus 431 of the ellipse are disposed in correspondence with each other (that is, the two focuses are disposed at optically corresponding locations).

Spectrum portions exiting from the transmissive LCD 401 are synthesized by the prism 101, and are reflected towards another focus 432 by the elliptical sweep mirror 102M. Since a cylindrical galvano-mirror 78S exists along the way, the spectrum portions are reflected by the galvano-mirror 78S and are focused on a cylindrical screen 111S. The cylindrical screen 111S is optically disposed at the focus 432 of the ellipse of the elliptical sweep mirror 102M. In other words, when a distance between the cylindrical galvano-mirror 78S and the cylindrical screen 111S is c, the distance between the cylindrical galvano-mirror 78S and the focus 432 is also c. c is also the curvature radius of the cylindrical screen 111S. A light incident surface of the cylindrical galvano-mirror 78S is a convex surface as shown by a hatched cross-sectional form thereof in the figure. As a result, the length of the emission line formed perpendicular to the plane of the figure on the cylindrical screen 111S can be made longer.

FIG. 26 shows a display device 34 of still another form. In this form, a prism 92 is used as the prism 92 and the prism 101 shown in FIG. 25, and an elliptical sweep mirror 102M is formed as a half mirror. More specifically, after light emitted from a light source 71 is reflected by a parabolic sweep mirror 91M, the light is actually focused upon a focus 451 of a parabolic line thereof (it is a focus of a parabolic line and, at the same time, a focus of the parabolic line of the parabolic sweep mirror 91M). However, actually, since the prism 92 is disposed in a light path, the light is divided into a spectrum and refracted at the prism 92 and is focused on a micromirror array 74. An elliptical sweep half mirror 102HM is disposed between the parabolic sweep mirror 91M and the prism 92. The light passes through the elliptical sweep half mirror 102HM and impinges upon the prism 92.

Spectrum portions reflected by the micromirror array 74 controlled on the basis of image data impinge upon and are synthesized by the prism 92. The light that has passed through the prism 92 impinges upon and is reflected by the elliptical sweep half mirror 102HM. After the reflection, the light impinges upon and is reflected by a cylindrical galvano-mirror 78S, thereby focusing the light on a cylindrical screen 111S. In this form, the focus 451 of the parabolic sweep mirror 91M is also one of the focuses of the elliptical sweep half mirror 102HM. Therefore, although the light reflected by the elliptical sweep half mirror 102HM should actually impinge upon the other focus 452 of an ellipse, since the galvano-mirror 78S exists along the way, the light is reflected by the galvano-mirror 78S and is focused on the cylindrical screen 111S. Consequently, a distance c between the cylindrical galvano-mirror 78S and the cylindrical screen 111S is equal to a distance c between the cylindrical galvano-mirror 78S and the other focus 452 of the ellipse. c is also the curvature radius of the cylindrical screen 111S.

In this form, since mirrors are used instead of lenses, not only can chromatic aberration be restricted, but also, since the prism 92 is also used as the prism 101 shown in FIG. 25, size and costs can be reduced due to fewer parts.

In the forms shown in FIGS. 22 to 26, if an fθ lens is disposed in a light path (for example, between the galvano-mirror and the screen) taken by the light, formed by synthesizing the spectrum portions, traveling towards the screen, it is possible to use a flat screen.

In the form shown in FIG. 25, one of the parabolic sweep mirror 91M and the elliptical sweep mirror 102M may be a mirror, and the other of the parabolic sweep mirror 91M and the elliptical sweep mirror 102M may be a lens system. Even in the form shown in FIG. 26, the parabolic sweep mirror 91M may be a lens system.

Further, in the specification, the term "system" refers to the entire apparatus comprising a plurality of devices.

The invention claimed is:

1. An image processing system for picking up and displaying an image, the image processing system comprising:
    a separating device configured to separate one line of light forming an optical image of an object, wherein the separating device includes a slit that separates the one line of the optical image of the object and an adjusting device that adjusts a position where the optical image of the object is incident upon the slit;
    a first dividing means for receiving the separated one line of light and dividing the one line of light into a first spectrum;
    a detecting means for detecting the first spectrum obtained by the first dividing means and outputting image data based on the detected spectrum;
    a second dividing means for dividing white light into a second spectrum;
    extracting means for extracting, from the second spectrum generated by the second dividing means, spectrum portions based on the image data detected by the detecting means;
    synthesizing means for synthesizing the spectrum portions extracted by the extracting means; and
    projecting means for projecting light formed by synthesizing the spectrum portions by the synthesizing means.

2. An image processing method of an image processing system for shooting and displaying an image, the method comprising:
    separating one line of light forming an optical image of an object, wherein the separating includes separating, with a slit, the one line of the optical image of the object and adjusting, with an adjusting device, a position where the optical image of the object is incident upon the slit;
    performing a first dividing operation, using a first optical image dividing device, for dividing the separated one line of light into a spectrum;
    detecting the spectrum, using a spectrum detecting device, obtained by the first dividing operation and outputting image data based on the detected spectrum;
    performing a second dividing operation, using a second optical image dividing device, for dividing white light into a spectrum;
    extracting, from the spectrum of the white light divided into the spectrum by the second dividing operation using a spectrum extracting device, spectrum portions based on the image data output by the detecting operation;
    synthesizing, using a synthesizing device, the spectrum portions extracted by the extracting operation; and
    projecting, using a projection device, light formed by synthesizing the spectrum portions by the synthesizing operation.

3. The image processing method according to claim 2, wherein the synthesizing the spectrum portions extracted by the extracting operation is performed using an image synthesizing processor.

4. An image pickup device for picking up an image, the image pickup device comprising:
    a dividing device configured to divide an optical image of an object into a spectrum;
    a detecting device configured to detect the spectrum obtained by the dividing device and to output a pixel of image data based on the detected spectrum;
    a separating device configured to separate one line of light forming the optical image of the object and to supply the separated one line of light to the dividing device; and
    a focusing device configured to focus the optical image of the object onto the detecting device,
    wherein the detecting device includes a plurality of photoelectric sensors, disposed in a plane, that detects the strength of the light, and a spectral component of each pixel of the one line of light, and
    the separating device includes a slit that separates the one line of the optical image of the object and an adjusting device that adjusts a position where the optical image of the object is incident upon the slit.

5. The image pickup device according to claim 4, wherein each photoelectric sensor includes an electron shock CCD.

6. The image pickup device according to claim 4, further comprising a diffuser disposed just behind the slit.

7. The image pickup device according to claim 4, wherein the dividing device includes a prism, and the image pickup device further comprises an optical member that causes the light exiting from the slit to be incident upon the prism as parallel light and the spectrum exiting from the prism to exit as converging light to the detecting device.

8. The image pickup device according to claim 4, wherein the adjusting device includes a galvano-mirror or a polygon mirror.

9. The image pickup device according to claim 4, wherein the adjusting device adjusts an incident position so that an entire optical image of the object is incident upon the slit every first period, and the detecting device outputs the image data every second period.

10. The image pickup device according to claim 9, wherein the first period is a vertical scanning period and the second period is a horizontal scanning period.

11. The image pickup device according to claim 4, further comprising an accumulating device that accumulates the image data output by the detecting device.

12. An image display device for displaying an image, the image display device comprising:
- a dividing unit configured to divide white light into a spectrum;
- an obtaining unit configured to receive image data based on a spectrum of an optical image of an object;
- an extracting unit configured to extract pixel spectrum portions based on the image data from the spectrum output by the dividing unit;
- a synthesizing unit configured to synthesize the spectrum portions extracted by the extracting unit and to output synthesized spectrum portions;
- a projecting unit configured to project light formed by the synthesized spectrum portions output by the synthesizing unit; and
- an adjusting unit configured to adjust a position of projection by the projecting unit,
- wherein the extracting unit includes at least one reflector or transmission unit, a number of the at least one reflector or transmission unit being in correspondence with a number of pixels forming one line in a direction parallel with a line of the optical image of the object and in correspondence with a number of spectrum portions of the optical image of the object for one pixel in a direction perpendicular to the line, the at least one reflector or transmission unit controlling reflection or transmission of the spectrum of the white light on a basis of the image data obtained by the obtaining unit,
- wherein the dividing unit includes a lamp for emitting the white light, a condensing optical system for condensing the white light from the lamp into a form of a line, and a spectral prism for dividing the white light into the spectrum, and
- wherein the synthesizing unit includes a synthesizing prism for synthesizing the spectrum portions extracted by the extracting unit.

13. The image display device according to claim 12, wherein the adjusting device includes a galvano-mirror or a polygon mirror.

14. The image display device according to claim 12, wherein the at least one reflector of the extracting unit includes a micromirror or reflective liquid crystal.

15. The image display device according to claim 12, wherein the at least one transmission unit of the extracting unit includes transmissive liquid crystal.

16. The image display device according to claim 12, wherein the obtaining device obtains the image data every first period, and the adjusting unit adjusts the projection position of the light formed by synthesizing the spectrum portions so that a line is successively displaced from another line every first period and one frame of image based on the image data is projected every second period.

17. The image display device according to claim 16, wherein the first period is a horizontal scanning period and the second period is a vertical scanning period.

18. The image display device according to claim 12, wherein the condensing optical system includes a cylindrical lens or a parabolic sweep mirror.

19. The image display device according to claim 12, further comprising a first optical member and a second optical member, the first optical member causing the light incident upon the spectral prism or the synthesizing prism to be parallel light, the second optical member causing the light exiting from the spectral prism or the synthesizing prism to be converging light.

20. The image display device according to claim 12, wherein the extracting unit is the reflector, the spectral prism and the synthesizing prism are formed as one prism, and the image display device further comprises a separating unit to separate light traveling towards the reflector from light traveling away from the reflector.

21. The image display device according to claim 12, wherein at least one of the condensing optical system and the projecting unit is a mirror.

22. The image display device according to claim 21, wherein the condensing optical system is a parabolic sweep mirror and the projecting unit is an elliptical sweep mirror.

23. The image display device according to claim 22, wherein a focus of the elliptical sweep mirror is positioned so as to optically correspond with a focus of the parabolic sweep mirror.

24. The image display device according to claim 22, wherein the light formed by synthesizing the spectrum portions is projected towards the other focus of the elliptical sweep mirror.

25. The image display device according to claim 21, wherein the condensing optical system is a parabolic sweep mirror and the projecting unit is an elliptical sweep half mirror.

26. The image display device according to claim 12, wherein the dividing unit includes a lamp for emitting the white light, a slit for separating, in a form of a line, a portion of the white light from the lamp, and a spectral prism for dividing the portion of the white light into the spectrum, and wherein the synthesizing unit includes a synthesizing prism for synthesizing the spectrum portions extracted by the extracting unit.

27. The image display device according to claim 12, further comprising a cylindrical screen for projecting thereon the light formed by synthesizing the spectrum portions.

28. An image processing apparatus for picking up and displaying an image, the image processing apparatus comprising:
- a separating device configured to separate one line of light forming an optical image of an object, wherein the separating device includes a slit that separates the one line of the optical image of the object and an adjusting device that adjusts a position where the optical image of the object is incident upon the slit;
- a first dividing means for receiving the separated one line of light and dividing the one line of light into a first spectrum;
- a detecting means for detecting the first spectrum obtained by the first dividing means and outputting image data based on the detected spectrum;
- a second dividing means for dividing white light into a second spectrum;
- a extracting means for extracting, from the second spectrum generated by the second dividing means, spectrum portions based on the image data detected by the detecting means; and
- a synthesizing means for synthesizing the spectrum portions extracted by the extracting means.

* * * * *